United States Patent [19]

Borschert et al.

[11] Patent Number: 5,721,681
[45] Date of Patent: Feb. 24, 1998

[54] ARRANGEMENT FOR CONTROL OF A CHASSIS VIBRATION DAMPING DEVICE

[75] Inventors: Udo Borschert, Sennfeld; Thomas Kutsche, Schweinfurt, both of Germany

[73] Assignee: Fichtel & Sachs AG, Schweinfurt, Germany

[21] Appl. No.: 430,566

[22] Filed: Apr. 28, 1995

[30] Foreign Application Priority Data

May 2, 1994 [DE] Germany .................. 44 15 155.1

[51] Int. Cl.[6] ................. B60G 17/06; B60G 17/015
[52] U.S. Cl. ................. 364/424.046; 364/424.047; 364/426.037; 250/158; 250/707
[58] Field of Search ................... 280/707, 702, 280/703, 688; 364/424.046, 424.047, 426.037

[56] References Cited

U.S. PATENT DOCUMENTS

| | | | |
|---|---|---|---|
| 5,062,497 | 11/1991 | Ogata | 180/300 |
| 5,071,159 | 12/1991 | Kamimura et al. | 280/707 |
| 5,075,855 | 12/1991 | Sugasawa et al. | 364/424.05 |
| 5,097,419 | 3/1992 | Lizell | 364/424.05 |
| 5,105,358 | 4/1992 | Takase et al. | 364/424.05 |
| 5,131,676 | 7/1992 | Kii et al. | 280/707 |
| 5,193,845 | 3/1993 | Yokote et al. | 280/707 |
| 5,218,546 | 6/1993 | Bradshaw et al. | 364/424.05 |
| 5,231,583 | 7/1993 | Lizell | 364/424.05 |
| 5,398,184 | 3/1995 | Yamaoka et al. | 364/424.05 |
| 5,408,411 | 4/1995 | Nakamura et al. | 364/424.01 |
| 5,444,621 | 8/1995 | Mataunaga et al. | 364/424.05 |
| 5,487,006 | 1/1996 | Kakizaki et al. | 364/424.05 |

FOREIGN PATENT DOCUMENTS

| | | |
|---|---|---|
| 0249209 | 12/1987 | European Pat. Off. . |
| 0464724 | 1/1992 | European Pat. Off. . |
| 1176981 | 4/1959 | France . |
| 1187937 | 2/1965 | Germany . |
| 4136224 | 8/1982 | Germany . |
| 4138831 | 6/1992 | Germany . |
| 4130090 | 9/1992 | Germany . |
| 920215403 | 2/1994 | Japan . |
| 2211152 | 6/1989 | United Kingdom . |
| 2253460 | 9/1992 | United Kingdom . |

*Primary Examiner*—Kevin J. Teska
*Assistant Examiner*—Thai Phan
*Attorney, Agent, or Firm*—Nils H. Ljungman and Associates

[57] ABSTRACT

For control of a frame-vibration damping device with a variable damping force characteristic in a motor vehicle (1), adjustment devices (9) of the vibration dampers (7) being controlled as a function of evaluated measurement signals of a single acceleration sensor (17) detecting the instantaneous value of an acceleration variable. The measurement direction (19) of the acceleration sensor (17) is turned at an angle of 45° in each case to the three axes of motion of the vehicle (longitudinal axis x, transverse axis y, and vertical axis z). Signal separation means (25) separate a first measurement signal component ($b_z$) by means of a bandpass filter (31) with midfrequency tuned to the natural frequency of the vehicle body (3), which represents the acceleration component in the vertical direction (z). Subtraction means (33), which develop the difference of the measurement signal of the acceleration sensor (17) and the first measurement signal component ($b_z$), deliver a second measurement signal component ($b_{xy}$) for the acceleration component in the plane of the longitudinal axis x and the transverse axis y. Evaluation means (35, 37) associated with the two measurement signal components deliver damping force requirement components $n_z$ and $n_{xy}$ which are added by adding means (39) to obtain a control signal which controls the adjusting device (9) representing the entire damping force requirement.

20 Claims, 9 Drawing Sheets

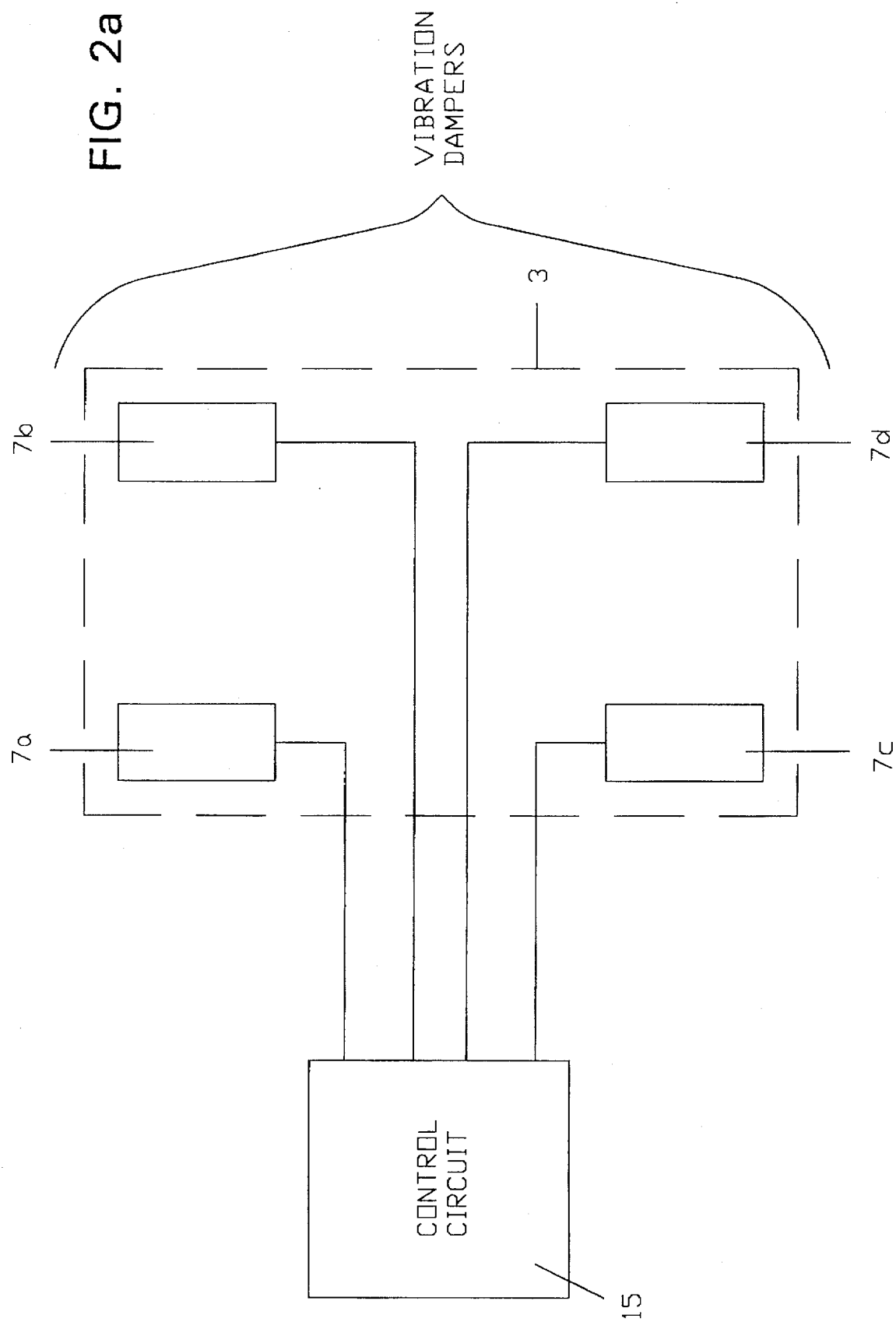

ARRANGEMENT FOR CONTROL OF A CHASSIS VIBRATION DAMPING DEVICE

BACKGROUND OF THE INVENTION

1. Field of the Invention

The present invention generally relates to an arrangement for the control of a chassis-vibration damping device with a variable damping force characteristic in a motor vehicle.

2. Background Information

In order to be able to better adapt the vibration damping characteristics of a motor vehicle chassis to the driving condition of the motor vehicle or road condition, it is known to make the damping force characteristic of individual vibration dampers, or even all vibration dampers, of the chassis variable. It is thus known from DE-A-41 36 224 (Great Britain Laid Open Patent Application No. 2 253 460 A) to measure or calculate operational parameters of the motor vehicle using a plurality of sensors, which parameters represent a measure for the instantaneous damping force requirement. The damping force requirement values determined in real time are generally converted, according to vehicle-specific evaluation functions, into a plurality of control values, or actuating variables, whose sum is a measure for the damping force characteristic to be set on the vibration dampers.

In particular, with known damping force control arrangements, the damping force characteristic is usually selected as a function of the instantaneous values of the transverse acceleration, the transverse Jerk, the longitudinal force, the variation in longitudinal force, the frequency-rated acceleration of the body, and the frequency-rated acceleration of the wheels. The damping force characteristic may be switched in a plurality of steps or continuously. For example, the damping force characteristic may be switched between a "hard" damping force characteristic (with a high damping force changing comparatively sharply as a function of the damper speed), by way of an "intermediate" damping force characteristic, to a "soft" damping force characteristic (whereby the damping force is at a relatively low level and changes less sharply as a function of the damper speed). To prevent overly frequent switching between the different damping force characteristics, a hysteresis device can be provided, and such a hysteresis device can temporally delay the switching of the damping force characteristic from "hard" to "soft" but not from "soft" to "hard".

With known damper control arrangements, a plurality of sensors is usually required to measure the relevant data in the three space or motion axes of the motor vehicle (longitudinal axis, transverse axis, and vertical axis) by means of separate acceleration sensors, or to calculate the relevant data from the measurement signals of equivalent sensors which detect the steering angle, the driving speed, the throttle valve angle, the engine speed, the brake pressure, etc.

OBJECT OF THE INVENTION

An object of the present invention is to provide an arrangement for control of a chassis-vibration damping device with a variable damping force characteristic in a vehicle, in particular, in a motor vehicle, which manages to determine the acceleration variables of the vehicle with fewer sensors than were previously required.

SUMMARY OF THE INVENTION

The present invention, in accordance with at least one preferred embodiment, preferably departs from an arrangement for control of a chassis-vibration damping device with a variable damping force characteristic in a vehicle including: an acceleration sensor detecting the instantaneous value of an acceleration variable on the vehicle in a measurement direction specified with reference to an axis of motion of the vehicle running longitudinally, an axis of motion running transversely, and an axis of motion running vertically, which sensor delivers a measurement signal representing the instantaneous value of the acceleration variable; an evaluation device which determines a damping force requirement as a function of the instantaneous value of the acceleration variable detected; and an adjustment device which sets the damping force characteristic of the chassis-vibration damping device as a function of the damping force requirement determined.

Preferably, the present invention, in accordance with at least one preferred embodiment, can be characterized in that the acceleration sensor in a vehicle, which has a natural frequency in the direction of at least one first of its axes of motion, is disposed in the vehicle with a measurement axis running at an angle to at least one of these first axes of motion and at least one second of its axes of motion, that the evaluation device includes signal separation means selectively responding to the natural frequency of at least one of the first axes of motion disposed in the signal path of the measurement signal, which separate the measurement signal into at least one first measurement signal component representing the instantaneous value of the acceleration variable in the direction of the first axis of motion and into a second measurement signal component jointly associated with each second axis of motion, that the evaluation device includes evaluation means associated separately with every first measurement signal component and the second measurement signal component, which generate requirement components of the damping force requirement variable as a function of the measurement signal component; and that the evaluation device includes adding means which add the requirement components to form a control signal specifying the damping force characteristic.

With an arrangement such as that described immediately above, the motion sensor disposed at an angle to at least two of the axes of motion of the vehicle can essentially jointly detect the acceleration components in the direction of a plurality of axes of motion. The natural frequencies specifically occurring in the direction of individual axes of motion can enable frequency selective separation of the measurement signal components representing the acceleration components for these axes of motion. These first measurement signal components, separable on the basis of natural frequency behavior, can essentially be eliminated in the measurement signals delivered by the acceleration sensor. The remaining second measurement signal component can thus essentially be jointly associated with the remaining axes of motion.

Despite the reduced number of acceleration sensors required, in this manner a plurality of measurement signal components associated with axes of motion can be evaluated separately from each other for the determination of the damping force requirement. The evaluation means provided for this, which may be memories of characteristics or of tables or the like, can essentially deliver evaluation functions that are optimizable separately from each other for each of the aforementioned first measurement signal components and the second measurement signal component. The evaluation functions can be determined in practice through driving tests, for example, from the standpoint of driving safety and riding comfort.

In a advantageous embodiment of the present invention, the signal separation means to separate the first measurement signal component from the measurement signal of the acceleration sensor can preferably include a filter tuned to the natural frequency as well as subtraction means. Preferably, the subtraction means can subtract each first measurement signal component from the measurement signal, to form the second measurement signal component. Essentially, the circuit complexity or outlay for such signal separation means will likely be relatively low. In order, for example, to eliminate noise signals originating with undesired natural frequencies from the measurement signal, a lowpass filter, which is permeable to the desired signal components but is closed to the undesired signals, can be connected upstream from the signal separation means. For example, in embodiments in which the signal separation means includes a bandpass filter tuned with its midfrequency to the natural frequency of a vehicle body, it can be advantageous to set the cutoff frequency such that the filter is permeable for the natural frequency of the vehicle body, but is closed to the natural frequency of the wheels of the vehicle.

In a preferred embodiment of the present invention, the acceleration sensor can be disposed on the vehicle with a measurement direction running at an angle to the vertical axis of motion. The measurement direction thus can also essentially run at an angle to at least one of the other two axes of motion. The signal separation means can preferably have, for delivery of the first measurement signal component, a filter selectively tuned to the natural frequency of the vehicle body which can vibrate in the vertical direction, in particular a bandpass filter with a midfrequency tuned to this natural frequency. Since the vehicle body is suspended on the frame of the vehicle with defined vibratability in the direction of the vertical axis of motion, the amplitude of the measurement signal restricted to the range of the natural frequency of the vehicle body can essentially provide a measure for the entire acceleration component in the vertical direction.

If the measurement direction of the acceleration sensor runs at an angle to only one of the two remaining axes of motion, i.e., either the longitudinal axis of motion or the transverse axis of motion, and thus lies in a plane normal to the axis relative to the respective other axis of motion, the second measurement signal component delivered by the signal separation means can essentially represent a measure for the acceleration component in the direction of this additional axis of motion running at an angle to the measurement direction.

However, provision is made in a preferred embodiment of the present invention that the acceleration sensor is disposed in the vehicle with a measurement direction at an angle to the longitudinal axis of motion and at an angle to the transverse axis of motion and that the signal separation means for delivery of the second measurement signal component have subtraction means subtracting the first measurement signal component from the measurement signal of the acceleration sensor. The measurement direction thus essentially can run at an angle to all three axes of motion of the vehicle, such that with a single acceleration sensor the entire acceleration behavior of the vehicle can de detected. Such an arrangement for control of damping can be installed quite simply and possibly even retrofitted.

The measurement direction of the acceleration sensor is preferably disposed at least at an angle of approximately 45° to the longitudinal axis of motion and to the transverse axis of motion. The sensitivity or the effect of the axis component acceleration values may be corrected by the angle. For example, the effect of transverse acceleration in general can be greater than that of longitudinal acceleration. This adjustment may be implemented through a larger surface share of the sensor for the transverse acceleration. The result is thus obtained that the acceleration components in the direction of the longitudinal axis of motion and the transverse axis of motion have the same effect on the control of the damping force. Preferably, the measurement direction is however also at an angle of 45° to the vertical axis of motion, a fact which facilitates the adjustment and scaling of the evaluation means.

The arrangement for control of damping according to the invention may be used with "active" frame-vibration damping devices, whereby the damping force of the vibration dampers is varied in that different fluid pressures can be controlledly built up in the vibration dampers by an external pressure fluid source. However, the arrangement for control of damping according to the invention may also be used with "adaptive" vibration dampers, whereby, for example, the vibration damper or dampers of the frame can be controlled by acting on the degree of opening of damping valves connected in parallel or in series in the sense of a change in the damping resistance. In both versions, valves are preferably connected to change the damping force characteristic.

To prevent overly frequent switching of the damping force characteristic and thus excessive wear of the mechanical components, provision is made in a preferred embodiment of the present invention that the evaluation device for restricting the frequency with which the damping force characteristic can be changed can be provided with a hysteresis device which temporally delays a change in the damping force characteristic in at least one of two opposing directions of change. In particular, for this, a temporal delay can be implemented essentially exclusively with a change from a harder damping force characteristic to a softer damping force characteristic. The driving-safety relevant changing of the damping force characteristic in the "harder" direction thus can essentially occur essentially immediately, whereas the return to the softer characteristic increasing riding comfort is delayed. Of course, in addition to the temporal hysteresis, different hysteresis thresholds can be provided for an appropriate amount of hysteresis. To be able to better adapt the hysteresis properties to the vehicle parameters, provision can be advantageously made that the hysteresis device has hysteresis means specifically associated with the individual evaluation means, which can temporally delay a change in the requirement components in at least one direction of change, in particular exclusively in the direction of a damping force requirement with a soft damping force characteristic.

The control of the damping force characteristic may take place in discrete steps, for example, by stepwise changing of the damping resistance, whereby control valves are turned on and off in one or a plurality of hydraulic throttle paths of vibration dampers determining the damping force characteristic. The evaluation means can, however, also be designed such that they deliver control signals directly for a proportional valve, whose opening cross-section determines the damping force characteristic. In this manner an essentially uniform change in the damping force characteristic can also be obtained.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

In summary, one aspect of the invention resides broadly in a suspension system for a vehicle, the vehicle including a vehicle body and at least one vehicle wheel, the suspension system comprising: adjustable vibration damping means for applying a vibrational damping action between the vehicle body and the at least one vehicle wheel and for varying at least one characteristic of the applied vibrational damping action in response to at least one vibrational damping control signal; means for Sensing an acceleration representative of the vehicle body and for generating at least one signal representative thereof; means for processing the at least one signal representative of the vehicle body acceleration and for generating therefrom the at least one vibrational damping control signal; the processing means comprising: means for separating the at least one signal representative of the vehicle body into at least two separate components; means for separately evaluating each of the at least two separate components and separately producing at least two subsidiary control signals respectively representative of each of the at least two separate components; and means for generating the at least one vibrational damping control signal as a function at least of the at least two subsidiary control signals.

Another aspect of the invention reside broadly in a suspension system for a vehicle, the vehicle including a vehicle body and at least one vehicle wheel, the suspension system comprising: adjustable vibration damping means for applying a vibrational damping action between the vehicle body and the at least one vehicle wheel and for varying at least one characteristic of the applied vibrational damping action solely in response to at least one vibrational damping control signal; means for sensing a single acceleration representative of the vehicle and for generating at least one signal representative thereof; and means for processing the at least one signal representative of the single vehicle acceleration and for generating therefrom the at least one vibrational damping control signal.

BRIEF DESCRIPTION OF THE DRAWINGS

In the following, an exemplary embodiment of the invention is explained in detail with reference to drawings, wherein:

FIG. 2a schematically illustrates a control arrangement with several vibration dampers;

DESCRIPTION OF THE PREFERRED EMBODIMENT

Figure 1:
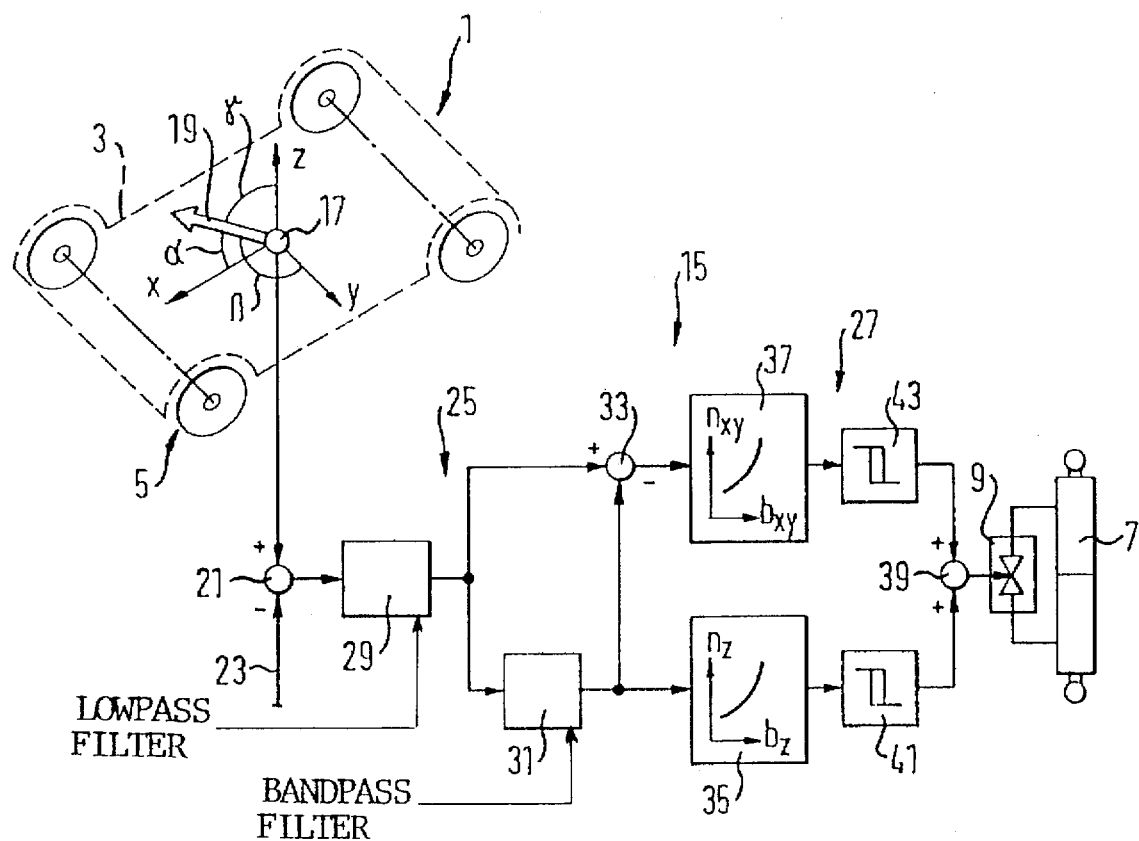
FIG. 1 is a schematic block diagram of an arrangement for control of a frame-vibration damper with a variable damping force characteristic in a motor vehicle.

FIG. 1 schematically depicts a motor vehicle 1, whose body 3 is supported via a suspension and vibration damping system on a multiple-axle frame 5. The suspension and vibration damping system preferably includes vibration dampers 7 associated with the individual wheels, of which only one is depicted. Each shock absorber 7 can preferably be an "adaptive" hydraulic shock absorber with a variable damping force characteristic. For this, the shock absorber 7 preferably has an adjustment device 9, which changes the damping resistance of the shock absorber 7 through one or a plurality of valves.

Each valve can be disposed in series or in parallel with a fluid path of the shock absorber 7 restricting the damping force. Advantageously, this can preferably be a proportional valve, whose degree of opening is also determined by the flow cross-section of the hydraulic path. Of course, valves discretely switchable between two control states possibly in conjunction with additional throttle openings can also be provided. Instead of "adaptive" shock absorbers, "active" shock absorbers may also be used, whereby the adjustment device affects the variable fluid pressure, in particular hydraulic pressure, from an external pressure fluid source.

Depending on whether it changes the damping force characteristic in steps or with uniform variation, the adjustment device 9 of the shock absorber 7, is preferably changed by a control signal changing in steps or between different signals or is varied by a uniformly changing control signal. A uniformly changing control signal is particularly suited for the control of a proportional valve, whereby the value of the control signal can essentially adjust the value of the damping force characteristic infinitely.

Figure 2:
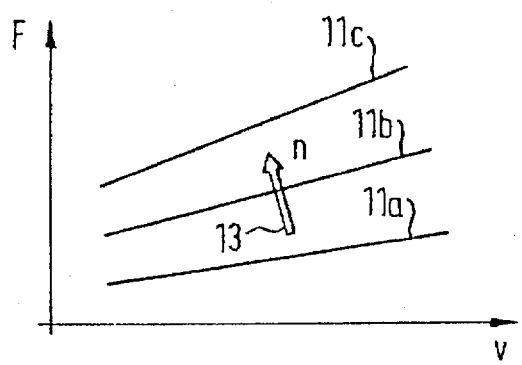
FIG. 2 is a diagram with a damping force characteristic fields

FIG. 2 depicts, using an example, a characteristic field with a plurality of damping force characteristics, here 11a, 11b, and 11c, which represent the dependency of the damping force F as a function of the adjustment speed v, with which the basic components that are shiftable with respect to one another during operation (i.e. the cylinder and the piston/piston-rod), move relative to each other. The arrow 13 indicates the direction of change of the control signal n selecting the damping force characteristic, for example, through its amplitude. The damping force characteristic 11a represents a "soft" damping force characteristic changing only slightly depending on the damping speed v at a comparatively low damping force level. The damping force characteristic 11c represents a "hard" damping force characteristic rising more sharply depending on the damping speed v at a higher damping force level. The damping force characteristic 11b represents a "mean" or "intermediate" damping force characteristic. By activating the soft damping force characteristic 11a increased riding comfort is obtained and the hard damping force characteristic 11c improves driving safety, but at the expense of riding comfort.

The adjustment device 9 is preferably controlled by a control circuit 15 generating the control signal n. For this, a separate control circuit can be provided for each individual shock absorber 7 or even for subgroups of shock absorbers 7. The control circuit 15 can, however, also be shared by all shock absorbers 7 of the frame 5. For generation of the control signal n, the control circuit 15 (or each of the control circuits) preferably responds to a single acceleration sensor 17, whose measurement direction 19 runs at an angle α to the longitudinal space and motion axis x running in the lengthwise direction of the vehicle, at an angle β to the transverse space and motion axis y running transverse to the longitudinal axis x, and at an angle γ to the vertical space and motion axis z running perpendicular to the lengthwise axis x and perpendicular to the transverse axis y. The angles α and β are preferably selected equal to about 45°, and the angle γ preferably also is about 45°. The angle α can, however, be dimensioned smaller than β to increase the effect of transverse acceleration. The measurement signal representing the instantaneous value of the acceleration of the vehicle body 3 delivered by the acceleration sensor 17 thus can essentially contain acceleration components for each of the three axes of motion.

The measurement signal of the acceleration sensor 17 is preferably fed via a difference stage 21, in which an offset signal fed at 23 compensating for the ground acceleration is subtracted, to signal separation means 25 of an evaluation device, designated generally with 27, of the control circuit 15. The signal separation means 25 preferably includes a lowpass filter 29, whose cutoff frequency preferably lies in the range of the natural frequency of the wheels of the vehicle, i.e., at approximately 10 to 15 Ms. The measurement signal of the acceleration sensor 17, preferably frequency-limited and offset-compensated by the lowpass filter 29, is preferably fed to a bandpass filter 31 of the signal separation means 25. The midfrequency of the bandpass filter 31 is preferably selected roughly equal to the natural frequency of the vehicle body 3 and preferably lies at approximately 1.5 to 2 Hz. The 3-dB bandwidth of the bandpass filter 31 can range, for example, from about 0.75 to about 2.5 Hz. Since the vehicle body 3 is capable of vibration because of the body suspension primarily in the direction of the vertical axis z, the output signal of the bandpass filter 31 represents an acceleration component $b_z$ or measurement signal component selectively associated with the vertical axis z. Subtraction means 33 of the signal separation means 25 preferably subtract the measurement signal component $b_z$ from the output signal of the lowpass filter 29 representing the entire acceleration in the measurement direction 19 and thus preferably deliver a measurement signal component $b_{xy}$, which is associated with the longitudinal axis x and the transverse axis y.

Thus, in other words, in accordance with at least one preferred embodiment of the present invention, since vehicle body 3 can essentially be considered as being configured to generally undergo greater vibration motion in the vertical, "z" direction than in either of the horizontal, "x" and "y" directions, a bandpass filter 31 can essentially be configured so as to provide an output representing an acceleration component/measurement signal component $b_z$ associated with the vertical, "z" axis. To this end, the bandpass filter 31 can preferably have a midfrequency that is preselected to be roughly equal to the natural frequency of the vehicle body 3.

Since the measurement direction 19 of the acceleration sensor 17 is however preferably angled at angles α and β of essentially the same size, each preferably 45° relative to the x, y axes, the acceleration components in the direction of the longitudinal axis x and the transverse axis y can essentially be represented in the same size in the measurement signal component $b_{xy}$. However, here again the angle α can be dimensioned smaller than the angle β to increase the effect of transverse acceleration.

The measurement signal components $b_z$ and $b_{xy}$ are preferably used independently of each other in the evaluation device 27 by separate evaluation means 35 and 37, respectively, for the determination of the damping force requirement component $n_z$ from the vibration in the direction of the vertical axis z on the one hand and the damping force requirement component $n_{xy}$ from the vibration in the plane of the longitudinal axis x and the transverse axis y on the other hand. The evaluation means 35, 37 can, for example, include memories of characteristics, which would associate the damping force requirement components $n_z$ and $n_{xy}$ with the measurement signal components $b_z$ and $b_{xy}$. The characteristics of the evaluation means 35, 37 can be determined from the standpoint of optimization of driving safety-riding comfort through practical tests. Adding means 39 of the evaluation device 27 add the damping force requirement components $n_z$ and $n_{xy}$ to obtain the control signal n representing the entire damping force requirement.

In accordance with the present invention, the "memories of characteristics" mentioned heretofore can take on essentially any form that is considered appropriate. For example, the evaluation means 35, 37 can conceivably include a lookup table that would permit the evaluation means 35, 37, to output a specific, stored value of $n_z$ or $n_{xy}$ for a given value of $b_z$ or $b_{xy}$ that is input into the evaluation means 35, 37. Alternatively, it is conceivable, within the scope of the present invention, for the evaluation means 35, 37 to include one or more mathematical functions that will output a value of $n_z$ or $n_{xy}$ by performing one or more predetermined mathematical manipulations on an input value of $b_z$ or $b_{xy}$. Whether in the case of a lookup table, or mathematical functions, or other suitable arrangement, it will be understood that the evaluation means 35, 37 can be configured, in advance, in any manner that is deemed appropriate, in order to provide desired result. For example, the evaluation means 35, 37 can be configured to provide output values of $n_z$ and $n_{xy}$ that optimize driving safety an riding comfort on the basis of practical tests.

To prevent excessive wear of the adjustment device 9 from overly frequent switching between different damping force characteristics, the adding means 39 can preferably be linked via separate hysteresis means 41 and 43, respectively, with the evaluation means 35, 37. The hysteresis means 41, 43 preferably effect a "temporal" hysteresis, by delaying the forwarding of a change of the damping force requirement component to the adding means 39 more in one change direction than in the other change direction. Advantageously, the damping force requirement component can preferably be delayed by a specified interval of time when it signals a damping force change from "harder" to "softer", i.e, in the direction of increased riding comfort. If the damping force requirement component signals a change in the direction of a harder damping force characteristic, i.e., An the direction of increased driving safety, the forwarding of the damping force requirement component to the addition means 39 can preferably take place advantageously without additional delay. Since separate hysteresis means 41, 43 are preferably associated with each evaluation means 35, 37, the aforementioned "temporal" hysteresis can be appropriately optimized.

Of course, instead of hysteresis means 41, 43 it is also possible to provide hysteresis means associated with the evaluation device 27 as a whole, for example, on the output of the adding means 39. Advantageously, the hysteresis means 41, 43 preferably do not respond until the crossing of predefined thresholds by changes of the damping force requirement components. The thresholds can be of different sizes in the two directions of change of the damping force requirement components. In particular, the threshold for switching in the direction of a "harder" damping force characteristic can conceivably be lower than in the opposite change direction.

FIG. 2a schematically illustrates an arrangement in which a control unit is connected so as to control four vibration dampers 7a, 7b, 7c and 7d. In a preferred embodiment of the present invention, each of the four vibration dampers 7a, 7b, 7c and 7d may be controlled individually. Alternatively, they may all be controlled similarly with respect to one another, or pairs of the dampers may be controlled similarly with respect to one another.

It is to be understood that arrangements other than those specifically illustrated and described herein with relation to control circuit 15 are conceivable within the scope of the present invention, for the purpose of attaining similar results.

The disclosure now turns to an arrangement having components which may be utilized in accordance with the preferred embodiments of the present invention, with reference to FIGS. 3–9. It should be understood that components disclosed herebelow, with relation to FIGS. 3–9 may, if appropriate, be considered to be interchangeable with components discussed hereabove with relation to FIGS. 1–2. Further details regarding the components illustrated and described with respect to FIGS. 6 and 7 and not otherwise set forth herein may be found in U.S. Pat. No. 4,989,148, which issued to Gürke et al. on Jan. 29, 1991, hereby incorporated by reference into the instant specification as if set forth in its entirety herein.

Figure 3:
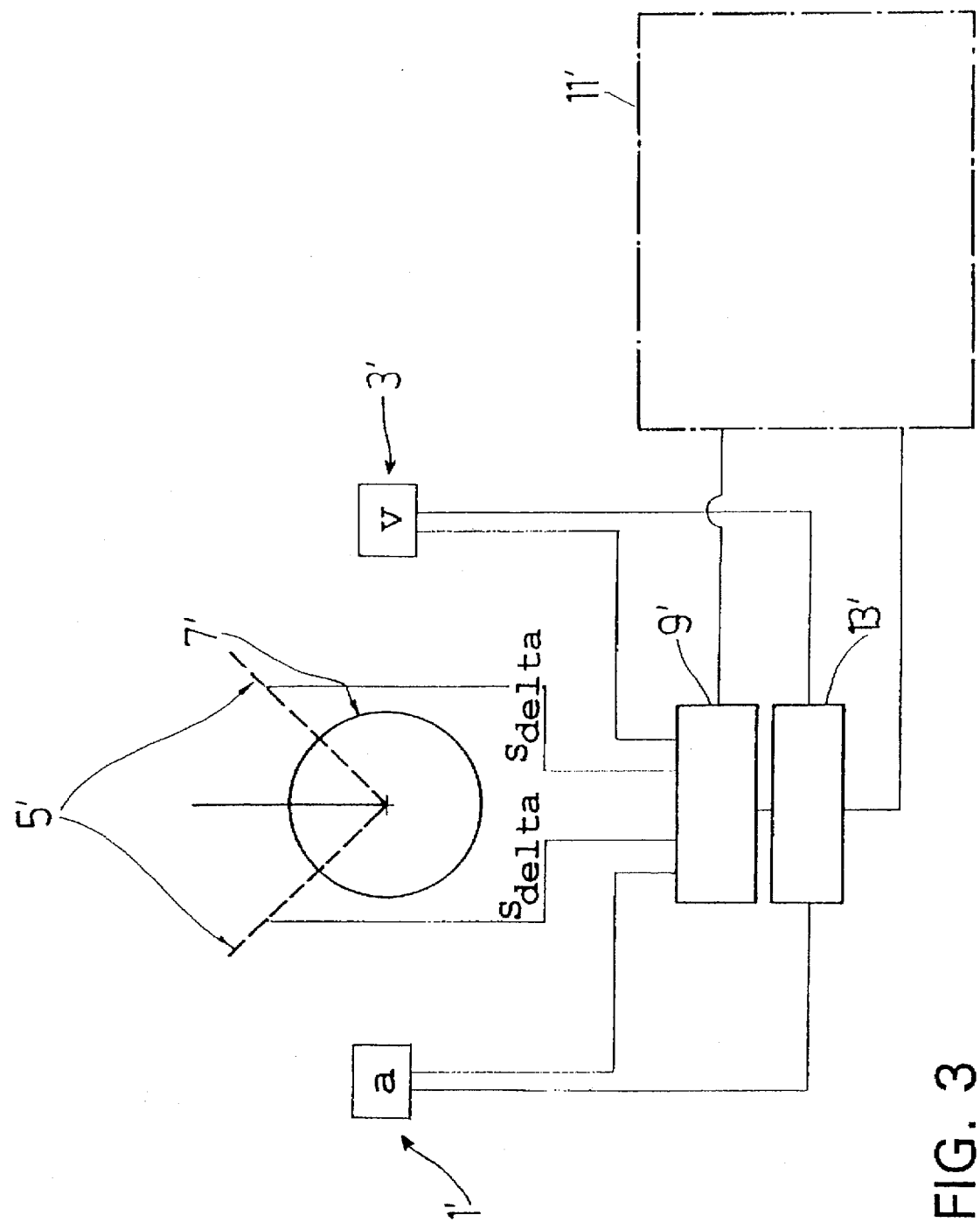
FIG. 3 shows a schematic diagram of a process system for the recognition of cornering.

FIG. 3 is a schematic diagram of a process which includes, among other things, at least one vehicle acceleration sensor 1' and a vehicle velocity sensor 3', such as a speedometer. To detect cornering, a steering angle switch 5' is also used, which sends a signal $s_{delta}$ to a computer 9' whenever the angle of the steering wheel 7' exceeds a defined steering wheel angle. On the basis of the signal $s_{delta}$, the absolute steering angle cannot be determined, but the steering angle direction can, which is then used to control the hydraulic system. The computer 9' stores an algorithm, which is illustrated by means of the two tables, separated into a table for the "on" function and a table for the "off" function of a hydraulic system 11' or the actuators of a hydraulic system 11'.

| Velocity v | Acceleration α | Steering Angle on 1/off 0 | Power Supply on 1/off 0 |
|---|---|---|---|
| ON | | | |
| $v < v_u$ | $a < a_s$ | 0/1 | 0 |
|  | $a > a_s \pm$ |  |  |
| $v_u < V < v_o$ | $a > a_s$ | 1 | 1 |
| $v > v_o$ | $a > a_s$ | 0/1 | 1 OFF |
| OFF | | | |
| $v > v_o$ | $a < a_h$ | 0/1 | 0 |
| $v_{ua} < V < v_o$ | $a < a_h$ | 0 | 0 |
| $v_{ua} < V < v_o$ | $a < a_h$ | 1 | 1 |
| $v < v_{ua}$ | $a > a_h$ | 0/1 | 1 |
|  | $a < _h$ |  |  |

There is essentially an AND relation between the velocity signal v and the acceleration signal a and the steering angle signal $s_{delta}$.

Activation of the power supply independent of the vehicle acceleration a and the steering angle occurs only above a lower vehicle velocity threshold value $v_u$. $V_u$ is set to extremely slow vehicle operation, such as maneuvering a vehicle for parking, and is stored in memory 9'. Above the vehicle velocity threshold value $v_u$ up to a velocity with an upper vehicle velocity threshold value $v_o$, the power supply is actuated only if there is both a steering angle signal and an acceleration a greater than the vehicle acceleration threshold value $a_s$. Above $v_o$, the power supply is actuated on the basis of a vehicle acceleration signal $a_s$, independent of a steering angle signal.

Assuming a vehicle velocity v above $v_o$, the hydraulic system 11' or the actuators are deactivated when the vehicle acceleration a is smaller than a vehicle acceleration threshold value $a_h$, which is smaller than the vehicle acceleration threshold value $a_s$. In this velocity range $v_u < v < v_o$, the actual values must drop below the steering angle threshold value and the vehicle acceleration threshold value $a_h$. A lower vehicle velocity threshold value $v_{ua}$ is used as the lower limit for deactivation, which is lower than the lower vehicle velocity threshold value $v_u$. The threshold values used to deactivate the system stabilize the process and simultaneously increase the margin of safety.

The hydraulic system 11' can be realized in a redundant fashion and can be used for a variety of suspension adjustments, such as spring settings or the horizontal stabilization of the vehicle, such as with an adjustable stabilizer. The intervention to feed the hydraulic system or the actuators can be accomplished in a number of ways. The supply pump can be uncoupled from the drive motor, or a pressure relief valve or a flow valve can also be connected so that the supply pump delivers an unpressurized flow into the supply reservoir of the hydraulic system. All the possible variants would advantageously reduce the energy use of the hydraulic system.

By way of example, a regulator 13' is shown which uses the signals from the measuring device 1' and 3' to adjust the actuators in the hydraulic system, whereby in other conceivable configurations, the computer 9' could send a signal to the regulator 13' so that the power supply would take place directly via the regulator 13'.

Figure 4:
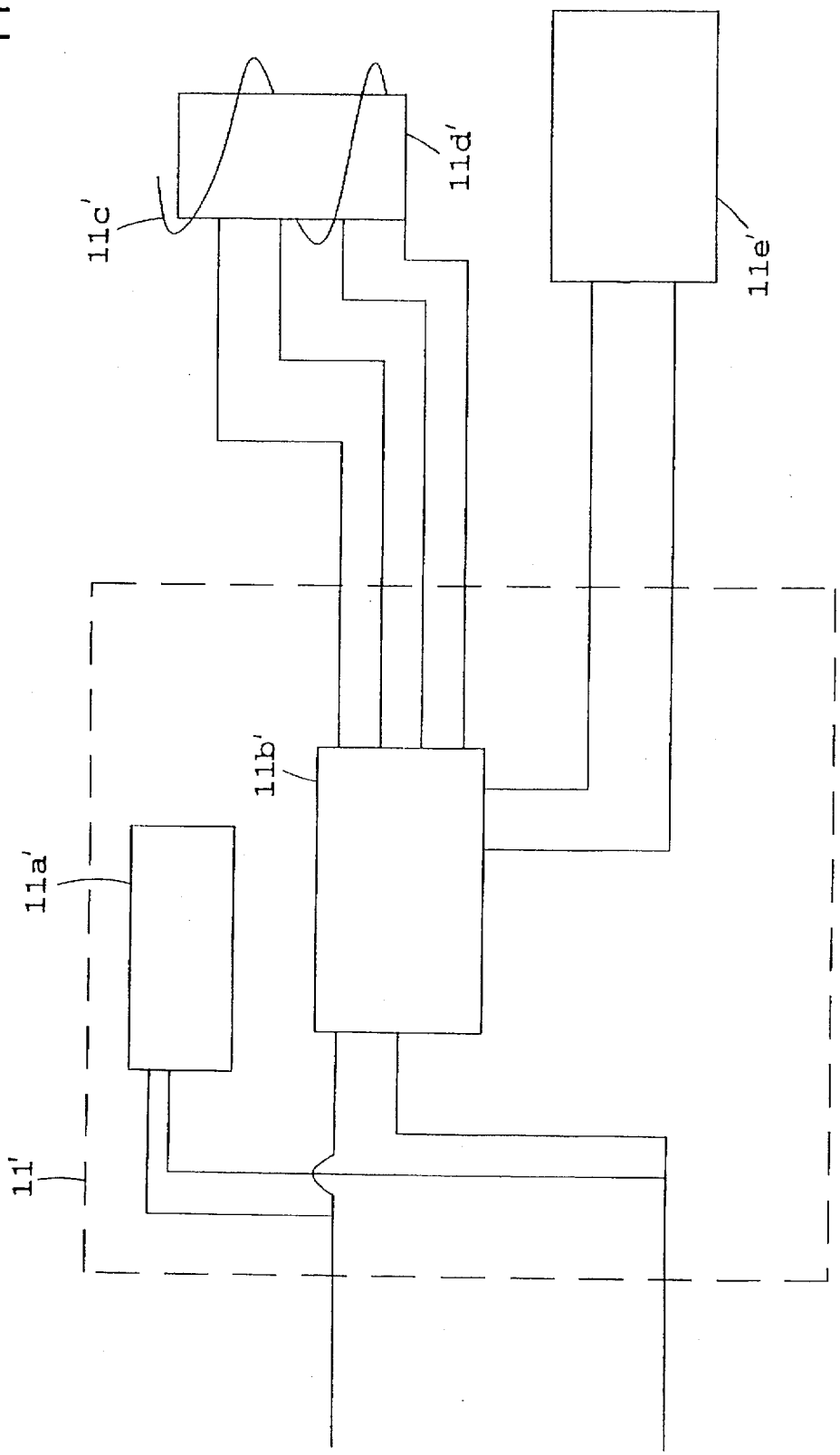
FIG. 4 shows a schematic diagram of a process system of FIG. 3.

FIG. 4 shows the hydraulic system 11' which contains pumps 11a', valves 11b', springs 11c', shock absorbers 11d', and the anti-rolling system 11e'.

Figure 5:
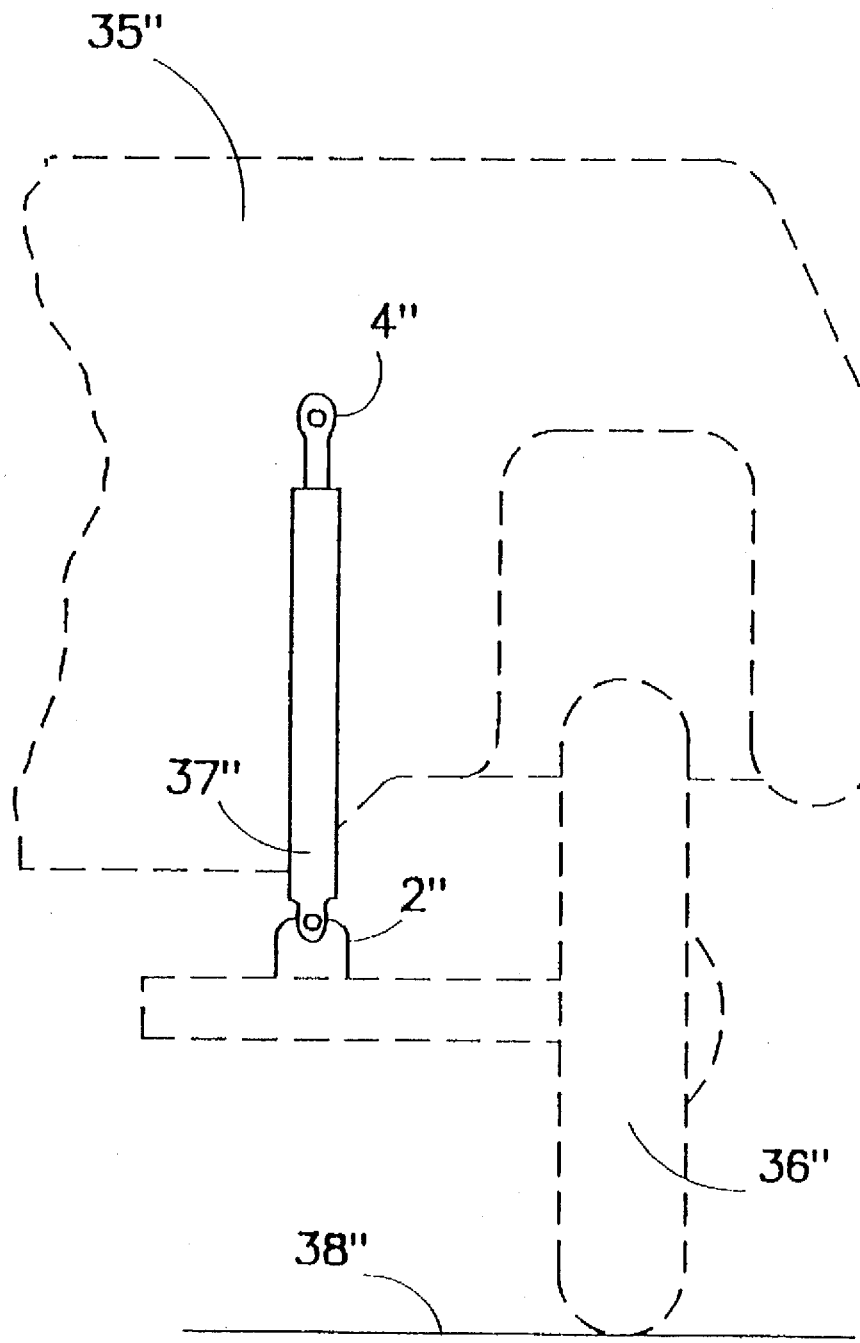
FIG. 5 schematically shows an illustrative practical application of a vibration damping apparatus in relation to a vehicle.

In FIG. 5, there is schematically shown an illustrative practical application of the vibration damping apparatus of the present invention in relation to a vehicle including a vehicle body 35" having a support wheel 36". The hydraulic vibration damping apparatus 37" is shown with the upper coupling member 4" fastened to move with the vehicle body 35" and the lower coupling member 2" fastened to move with the wheel 36". As the vehicle body 35" travels along a roadway 38", the support wheel 36" will move relative to the vehicle body 35", and the damping apparatus 37" will operate to damp undesired vibrations and relative movements between the vehicle body 35" and the support wheel 36" in response to sensed relative movement between the vehicle body 35" and the support wheel 36".

Figure 6:
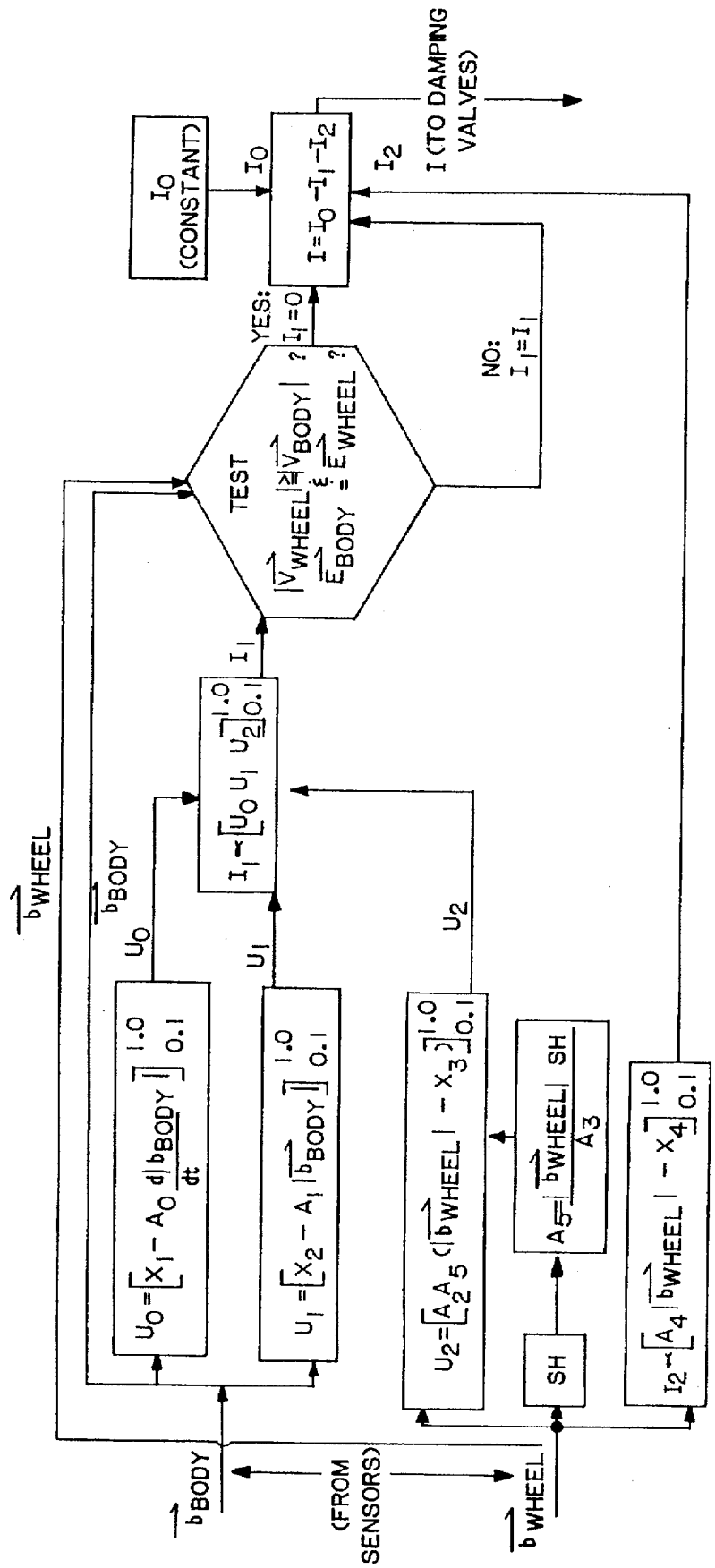
FIG. 6 is a schematic (or algorithmic) representation of a vibration damping apparatus in relation to a vehicle.

One situation in which the present invention may be used is discussed below. Referring to FIG. 6, signals indicative of the acceleration of the vehicle body $b_{body}$ and of the acceleration of the vehicle $b_{wheel}$ are utilized to derive therefrom signals indicative of damping force characteristics which are used to adjust vibration dampers included in a suspension system and are capable of exerting a variable damping force between the wheels and the body of a vehicle, to thereby substantially reduce the road shock transmitted to the body through the wheels.

Preferably, the sensor signals $b_{body}$ and $b_{wheel}$ are vector signals in the sense that they contain information indicative of not only the magnitude of acceleration of the respective vehicle part, but also the direction of such acceleration. For example, a positive signal could be used to indicate a vertically upward direction of acceleration, while a negative signal could be used to indicate a vertically downward direction of acceleration. Signals $b_{body}$ and $b_{wheel}$ might, for example, be generated by accelerometers, which are well known in the art and are described, for example, in U.S. Pat. No. 3,731,542, issued to Forsberg on May 8, 1973 and entitled "Optical Accelerometer" and U.S. Pat. No. 4,104,921, issued Aug. 8, 1978 to Nissl and entitled "Piezo Electric Acceleration Transducer", both patents of which hereby expressly incorporated by reference, with the same effect as if they were set forth in their entirety herein. An additional apparatus relating to variable vibration damping is disclosed in U.S. Pat. No. 4,638,670, issued on Jan. 27, 1987 to Moser and entitled "Apparatus for the Determination of the Distance Travelled by a Piston in a Cylinder", which is also hereby expressly incorporated by reference with the same effect as if the entire contents thereof were fully set forth herein.

It will be seen that, within the accompanying drawings, an arrow (i.e., "←") is sometimes employed to indicate a vector signal, i.e., a signal having both a magnitude and direction. Within the written portion of the specification, the use of a vector arrow has not been employed. However, the signals b, V and E should be understood to be vector signals, the magnitudes of these signals being indicated through the use of the absolute value symbol, e.g., "$|b_{body}|$."

As shown schematically in FIG. 6, the signal $b_{body}$ which is indicative of both the magnitude and the direction of acceleration of the vehicle body, is used to derive two intermediate signals $U_0$ and $U_1$, according to the transformations (e.g., formulae) 1) and 2) set forth below. It will be appreciated by those of ordinary skill in the art that the carrying out of these signal processing steps (or formulas) may be accomplished by various equivalent means, such as, for example, through the use of a microprocessor, a digital filter, or the like, in which case all of the signals discussed herein could be converted between analog and digital form through the use of analog to digital (A/D) and digital to analog (D/A) converters.

$$U_0 = \left[ X_1 - A_0 \frac{d\,|b_{body}|}{dt} \right]_{0.1}^{1.0} \quad 1.)$$

$$U_1 = [X_2 - A_1\,|b_{body}|]_{0.1}^{1.0}, \quad 2.)$$

wherein $|b_{body}|$ quals the absolute value or (magnitude) of the acceleration, of the vehicle body, $$\frac{d\,|b_{body}|}{dt}$$

equals the first derivative of the absolute value of the vehicle body acceleration with respect to time, and $A_0$, $A_1$, $X_1$ and $X_2$ are appropriately chosen constants based upon the particular vehicle characteristics (size, weight, etc.), empirical testing, expected road conditions, and the like.

Another intermediate signal $U_2$, and an intermediate current $I_2$, are determined using the absolute value of the wheel acceleration, $b_{wheel}$, according to the following signal processing transformations 3) and 4):

$$U_2 = [A_2\,A_5(|b_{wheel}| - X_3)]_{0.1}^{1.0} \quad 3.)$$

-continued $$I_2 \propto [A_4|b_{wheel}| - X_4]_{0.1}^{1.0} \quad 4.)$$

wherein $A_2$, $A_4$, $A_5$, $X_3$ and $X_4$ are once again appropriately determined constants.

The coefficient $A_5$ is determined according to the following formulation 5)

$$A_5 = \frac{|b_{wheel}|\,SH}{A_3} \quad 5.)$$

wherein the absolute value of $b_{wheel}$ SH is the absolute value of the wheel acceleration as determined by a sample and hold circuit, SH, and $A_3$ is, once again, an appropriately determined, substantially constant value.

Preferably, according to a well known sampling theorem, the sample and hold circuit, SH, is operated at a sampling frequency which is at least equal to or greater than twice the frequency of vibrations which design considerations determine should be taken into account, and are most preferably any known or expected resonance frequencies of the wheels. Additionally, the sample and hold circuit, SH, may include memory and comparator circuitry for determining and maintaining in memory the maximum wheel acceleration determined over an appropriate period of time.

Another intermediate current or signal $I_1$ is determined or produced in a proportional relationship to the product of the three intermediate signals $U_0$, $U_1$ and $U_2$ as follows:

$$I_1 \propto [U_0\,U_1\,U_2]_{0.1}^{1.0} \quad 6.)$$

In the above formulas (or transformations) 1–4 and 6, the intermediate signals $U_0$, $U_1$, $U_2$, $I_1$ and $I_2$ are all subjected to a limiting process such that their values, in a preferred embodiment, are limited to between about 0.1 and about 1.0. of course, other appropriate limits might be utilized, depending upon the limits of adjustment of the particular vibration damping apparatus employed, etc.

It will be seen from FIG. 4 that the actual value of the variable damping control signal I, transmitted to the vibration damping apparatus, is preferably determined according to the following relationship:

$$7.)\ I = I_0 - I_1 - I_2$$

wherein $I_0$ is preferably a constant reference value, and wherein $I_1$ and $I_2$ preferably have values between 0.1 and 1.0 determined according to relationships 4) and 6) set forth above. Also, preferably, the variable damping control signal is limited so as to be allowed to range only between the limits of about 0 and about $I_{max}$. Most preferably, the damping control signal I is an electrical current used to set the damping characteristics of variable damping vibration isolation apparatuses (or shock absorbers), the damping characteristics of which can be current controlled. In an embodiment wherein all or part of the above-described signals are derived via numerical computation by a microprocessor or the like, preferably, the final control signal I will be converted by means well known in the art, to a current having a relatively corresponding value. However, it will be appreciated that any other signal, digital or analog, such as a voltage signal, a binary numerical representation, etc. may be derived which reflects the relationships set forth above.

As noted in relationship 7) set forth above, the final control signal I is, in part, derived by reducing the reference control signal $I_0$ by the intermediate signal $I_2$, as reflected in transformation 4). The reference control signal $I_0$ is preferably further reduced by the intermediate signal $I_1$ to derive the final control signal I. However, a test is first conducted to determine whether the reference signal $I_0$ is to be so further reduced by the intermediate signal $I_1$.

Figure 7:
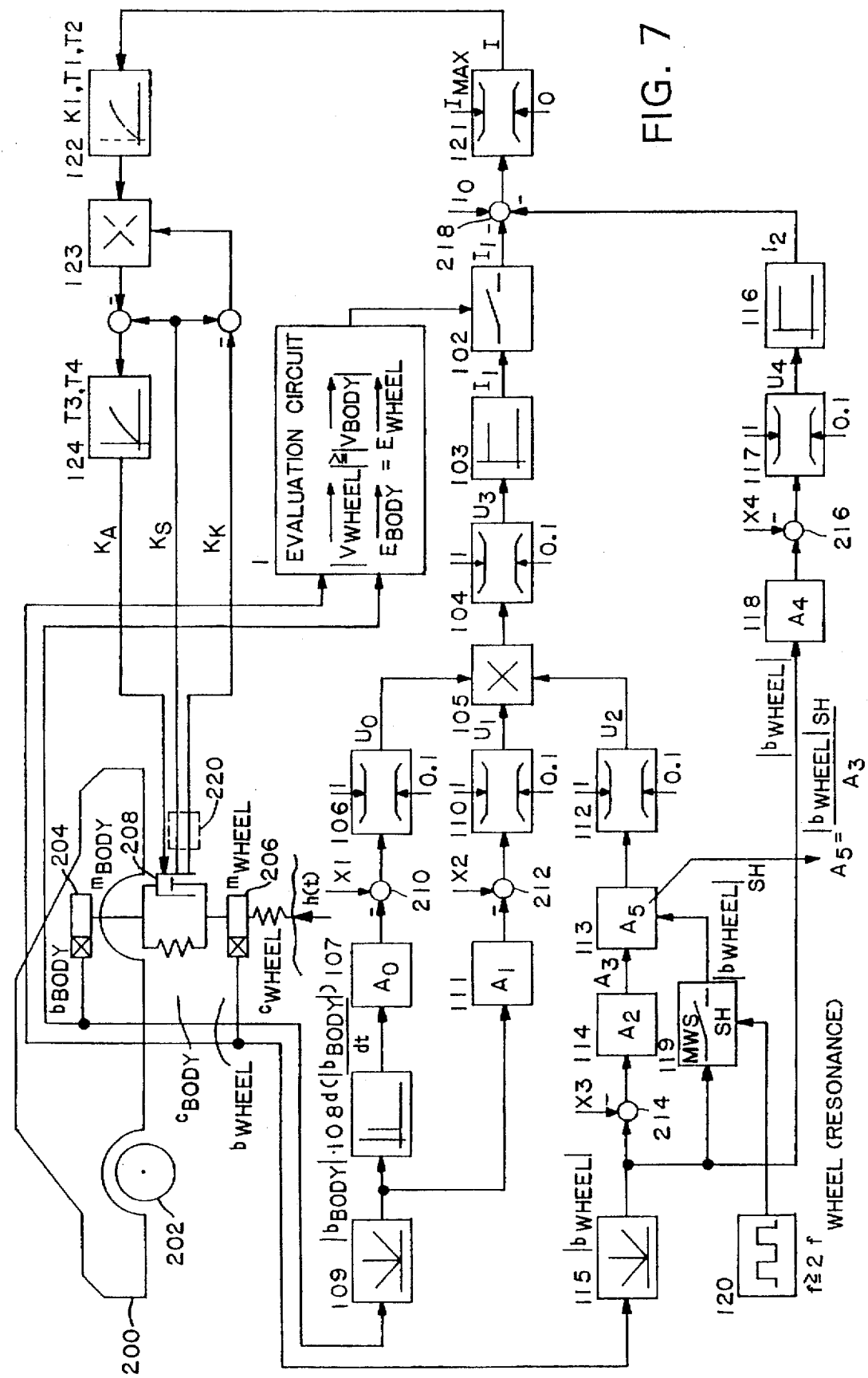
FIG. 7 schematically illustrates an apparatus for the control of a two mass system.

A further example of such a test circuit or algorithm is more fully set forth in FIG. 7. However, and still referring to FIG. 6, it will be seen that, in brief, the actual vector values indicating both the direction and magnitude of the wheel acceleration and of the body acceleration are employed in a test circuit (or algorithm), wherein the following two conditions 8) and 9) are checked:

$$|V_{wheel}| \geq |V_{body}|?;  \quad\quad 8)$$

and $$E_{body} = E_{wheel}?  \quad\quad 9.)$$

Specifically, tests are conducted to determine a) whether the absolute value of the wheel velocity is equal to or exceeds the absolute value of the body velocity, and b) whether the body and the wheel are both moving in the same direction. The values for the velocities of the wheel and body may be readily determined by integration of the acceleration signals, through means well known in the art, such as, for example, numerical integration via a microprocessor, or analog integration through the familiar circuit of a resistor and an amplifier connected in series, with a feedback capacitor connected across the amplifier.

If both conditions 8) and 9) are met, then the intermediate signal $I_1$ is set to 0 and is not subtracted from the reference signal $I_0$ in determining the final damping control signal I. Since, in a preferred embodiment, the rigidity (or degree of stiffness) of the damping apparatus varies inversely with respect to the control signal I, satisfaction of both relationships 8) and 9) and of a corresponding setting of $I_1$ to 0 results in the setting of a relatively softer damping characteristic.

FIG. 7 is another schematic depiction of an example where the present invention may be utilized, wherein the various processing of signals set forth in equations 1)–9) above and illustrated algorithmically in FIG. 6 is preferably carried out, at least in part, using analog components and analog signals, such as, for example, current voltage, etc. Of course, it will be readily appreciated by one of ordinary skill in the art that the example, as shown in FIG. 7, can be equally well carried out employing other equivalent technology, such as, for example, digital processing techniques.

Referring again to FIG. 7, a vehicle equipped with the examples which may employ the present invention has a vehicle body 200' having a mass $m_{body}$ and a vehicle wheel 202' having a mass $m_{wheel}$. The interaction of the vehicle body and vehicle wheel with one another through a vibration damping apparatus having variable damping characteristics 208' is approached by considering the vehicle body to have a spring constant of $c_{body}$ and the wheel to have a spring constant of $c_{wheel}$. Two sensors e.g., accelerometers) 204' and 206' generate vector acceleration signals $b_{body}$ and $b_{wheel}$ representative of both the direction and the magnitude of the accelerations of the body and wheel, respectively. Such acceleration signals are generated in response to the interaction of the vehicle body and wheel with an uneven road surface depicted generally as a function h(t). The vehicle body acceleration signal $b_{body}$ is processed according to equation 1) above to generate an intermediate signal $U_0$ via an absolute value generator 109, a differentiator 108, a coefficient multiplier 107, a summation (or subtraction) element 210' and a limiting circuit 106.

Substantially in parallel, an intermediate signal $U_1$ is generated via a coefficient multiplier 111, a summation (or subtraction) element 212' and another limiting circuit 110. The wheel acceleration $b_{wheel}$ sensed by accelerometer 206' is processed according to equation 3) set forth above to produce the intermediate signal $U_2$ via an absolute value generator 115, a summation (or subtraction) element 214', a coefficient multiplier 114, a coefficient multiplier 113 and a still further limiting circuit 112. The coefficient $A_5$ employed in coefficient multiplier 113 is, in turn, derived according to equation 5) above as a function of the wheel acceleration produced by a sample and hold circuit 119, which is driven at a sampling frequency f which is at least equal to or greater than twice the resonant frequency of the wheel $f_{wheel}$ (resonance). Sample and hold circuit 119 may preferably incorporate memory circuitry and comparitor circuitry for maintaining in memory the greatest wheel acceleration produced over an appropriately chosen period of time.

The three generated intermediate signals $U_0$, $U_1$ and $U_2$ are all multiplied together in a multiplier element 105, and the resulting product is limited in limiting circuitry 104, such that, preferably, its value ranges between about 0.1 and about 1.0. The thus limited product signal, designated in FIG. 5 as $U_3$, is then introduced into a proportional current generating circuit 103. For example, intermediate signal $U_3$ could be a voltage representative signal, and current generating element 103 could be a voltage controlled current source, e.g., a transistor circuit well known in the art which generates a proportionately representative current signal $I_1$ in response thereto.

The absolute value of the wheel acceleration produced by absolute value generator 115 is also further processed, substantially in parallel, to produce a second intermediate current signal $I_2$, according to equation 4) above, via coefficient multiplier 118, summation (or subtraction) element 216', limiting circuitry 117 and an additional voltage controlled proportional current source 116.

A constant reference current $I_0$ is introduced into addition (or subtraction) element 218', wherein signal $I_2$ is subtracted from reference signal $I_0$ to partially produce the vibration damper control signal I.

In Evaluation Circuit 1, discussed more fully in connection with FIG. 6, the body and wheel accelerations are integrated to yield the body and wheel velocities $V_{body}$ and $V_{wheel}$, respectively. Testing is then, conducted to determine whether both of the following conditions are met: a) whether the wheel velocity exceeds or at least equals the body velocity, and b) whether the directions of the two velocities are identical. If both of these conditions are met, then the value of the intermediate signal $I_1$ is set to 0. In other words, in such a case, the constant reference signal $I_0$ is not further reduced by the value of the intermediate signal $I_1$. Otherwise, if both of the above conditions are not met, the value of the intermediate signal $I_1$ is set to its actual processed value, and the value of the constant reference signal $I_0$ is further reduced by this processed value $I_1$ in addition (or subtraction) element 218'.

The value of the calculated control signal I is appropriately limited in a still further limitation circuit 121 between maximum and minimum values $I_{max}$ and 0, appropriately set according to the range of possible adjustment of the vibration damping apparatus being employed.

As noted above, the vibration damping apparatus 208' preferably, exhibits a variable damping characteristic, preferably in response to a variable control current signal I. One possible such variable damping apparatus is disclosed in U.S. Pat. No. 4,749,069, issued Jun. 7, 1988 to Knecht, et al.

and entitled "Vibration Damper for Motor Vehicles having an Arrangement for Varying Damping Thereof", which patent is hereby expressly incorporated by reference with the same effect as if the entire contents thereof were expressly set forth herein.

Even more preferably, the vibration damping apparatus 208' will have a damping characteristic which is variable between a relatively stiff damping characteristic $K_S$ and a relatively soft damping characteristic $K_K$. Additionally, in an even more preferred embodiment, the vibration damping apparatus 208' includes means for setting, either manually or otherwise, the damping characteristic limits $K_S$ and $K_K$. Still further, in a particularly preferred embodiment, the vibration damping apparatus 208' includes circuitry (e.g., limit indicators and a potentiometer) 220' which generates signals representative of the currently set damping characteristic limits $K_S$ and $K_K$.

The damping force characteristic $K_A$ actually applied by vibration damping apparatus 208' is, therefore, in general, a function of $K_S$, $K_K$ and I. Moreover, the damping force characteristics need not be absolutely linear functions, but may be nonlinear and may vary additionally with respect to time, etc. In general, the actual applied damping force characteristic $K_A$ will be a member of the general family of characteristics represented as:

$$K_A = K_S - (K_S - K_K) \times K_1 \times I$$

In FIG. 5, this general family of damping characteristics is schematically represented by a proportional conversion element 122, which includes time delay means dependent upon T1 and T2, multiplication circuitry 123 and a proportional conversion element 124, incorporating time delay means dependent upon T3 and T4.

Dependent upon the control current I, the damping characteristic limit signals $K_S$ and $K_K$ provided by limit indication means 220', and appropriately determined parameters K1, T1, T2, T3, and T4, the damping characteristics of vibration damping apparatus 208', therefore, appropriately set between the applicable limits.

Referring again to FIG. 7, there, the wheel suspension of a vehicle wheel of a vehicle is simulated by means of a two mass system. The weight of the vehicle body is represented by $m_{body}$, the wheel mass by $m_{wheel}$, the spring constant of the vehicle body by $c_{body}$ and the spring constant of the vehicle wheel by $c_{wheel}$. The unevenness of the road is designated h(t). The vibration damper is described by the damping force constant $K_A$, which is, in turn, influenced by the valve control current I.

In the Evaluation Circuit 1, a switching criterion is derived to activate the analog circuit 102. The vehicle always runs on the lowest damping force characteristic, if the following conditions are fulfilled: 1) the velocity of the wheel is greater than the velocity of the vehicle body, and 2) the direction of the unit vectors of the wheel and of the body are identical. For this purpose, the wheel acceleration and the vehicle body acceleration are determined by sensors, and processed by the Evaluation Circuit 1, shown in greater detail in FIG. 8. In practice, to fulfill these conditions, a critical value circuit and a hysteresis (or memory circuit) may be permitted. If the criterion is fulfilled, switch circuit 2 is opened, such that the current $I_1$ equals zero, and the valve current is determined only by the current $I_0$ and by the current $I_2$.

If the switching criterion is not fulfilled, the damping force is continuously set by the control circuit $I_1$. This control circuit $I_1$ is formed by the multiplication of the voltages $U_0$, $U_1$ and $U_2$ in the multiplier 105 and the voltage current transformation in the proportional element 103. For example, a voltage controlled current source, such as a transistor circuit, well known in the art, could be utilized for proportional element 103. The limiters 104, 106, 110, 112 and 117 limit the output voltages to within a defined range. For example, this range in FIG. 4 is shown normalized to between 0.1 and 1. $U_0$ is calculated from the absolute value of the vehicle body acceleration 109, the differentiator 108, the coefficient multiplier 111 and the constant $X_1$. $U_1$ is calculated from the absolute value of the vehicle body acceleration 109, the coefficient multiplier 107 and the constant $X_2$.

The influence of the roadway is taken into consideration by the vehicle wheel acceleration in the coefficient divider 113, the coefficient multiplier 114, the constant $X_3$, the absolute value generation of the vehicle wheel acceleration 115, the maximum value memory 119 and the frequency generator 120.

Since the damping force characteristics do not, as a rule, follow a linear path, there are different comfort actions for different roadway profiles. This influence can be corrected by means of the coefficient divider 113, the maximum value memory 119 and the frequency generator 120. In the additional sample and hold circuit 119, the maximum wheel acceleration for the half-period of the wheel resonant frequency is buffered, and transmitted to the coefficient divider 113 to correct the control voltage $U_2$.

The safety of the vehicle is determined, among other things, by the dynamic wheel load fluctuations. Severe wheel accelerations caused by the roadway also increase the wheel load fluctuations. In the proportional element 116, from the limiter 117, the constant $X_4$, and the coefficient multiplier 118 and the absolute value of the vehicle wheel acceleration 115, therefore, a control current $I_2$ is calculated, which continuously increases the damping force with increasing wheel acceleration.

For the realization of the control apparatus, an adjustment valve is necessary, which produces a proportional action between the hardest damping force characteristic $K_S$ and the minimum valve current, e.g. I =0, and the softest damping force characteristic $K_K$ and the maximum valve current $I_{max}$. The damping force characteristics need not be linear. For example, the damping force constant $K_A$ for any random point in the family of characteristics can be calculated from:

$$K_A = K_S - (K_S - K_K) \times K_1 \times I.$$

The damping force constant of the vehicle body $K_A$ is proportional to the control current I, whose amplitude can be limited in the limiter 121 to a desired range, e.g., between about 0 and about $I_{max}$. The regulation of the adjustment valve is described in the proportional element with a delay 122 by $K_1$, $T_1$ and $T_2$. The temporal action of a Vibration damper is taken into consideration in an additional proportional element with delay 124 by $T_3$ and $T_4$.

Figure 8:
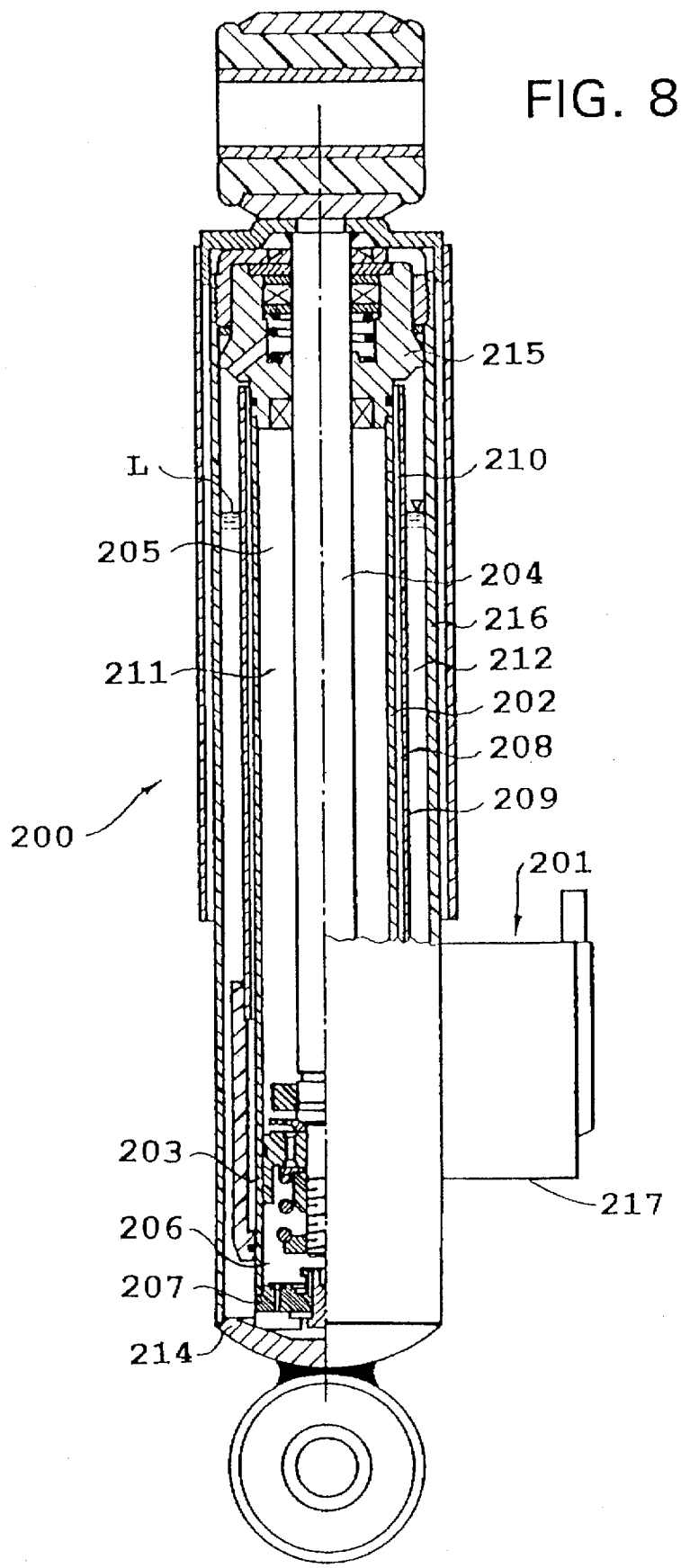
FIGS. 8 and 9 show a complete shock absorber assembly.
Figure 9:
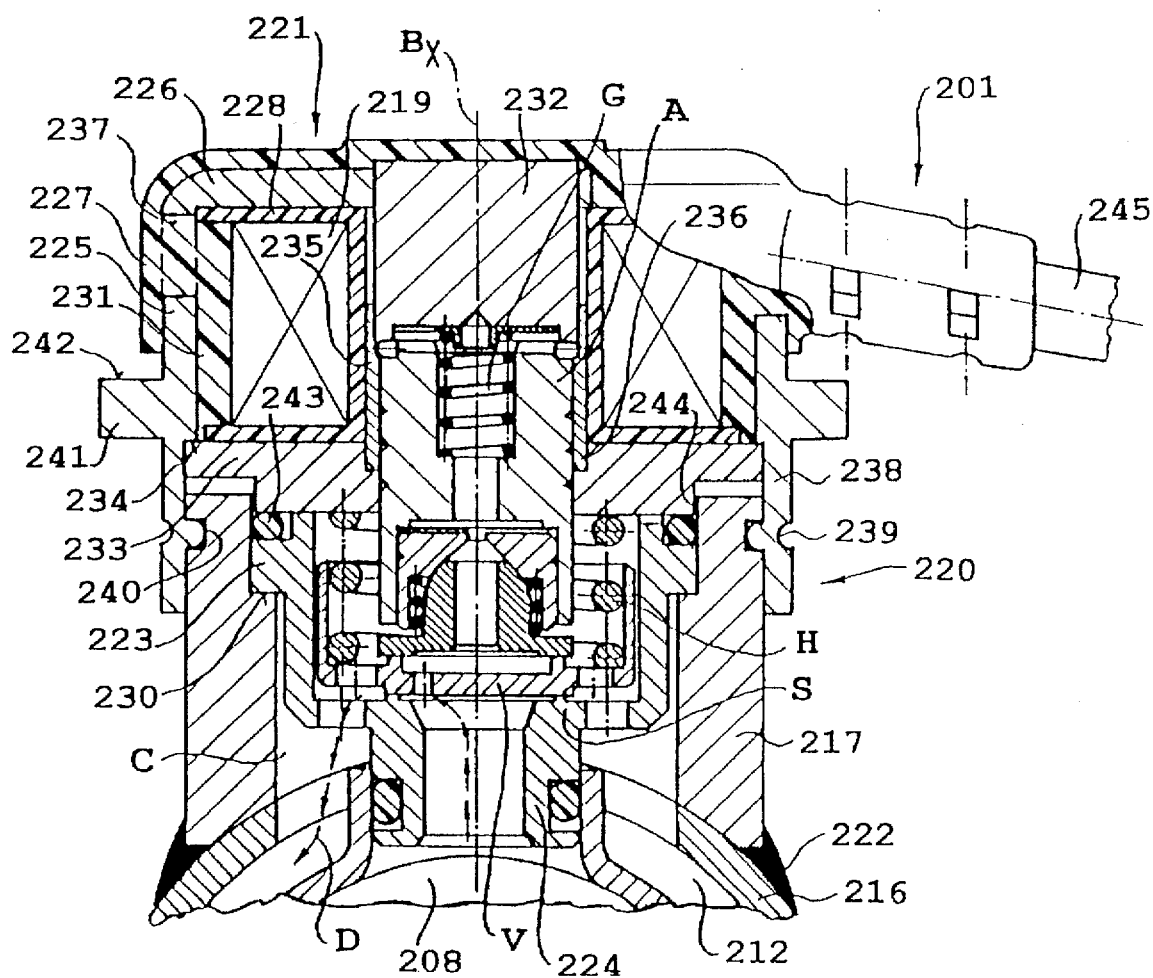

FIGS. 8 and 9 show a typical shock absorber or vibration damper in which the embodiments of the present invention may conceivably be incorporated. It should be understood that the components found hereinbelow are interchangeable with the components discussed hereinabove with reference to FIGS. 3–7 through.

FIG. 8 shows a complete shock absorber or oscillation damper 200, a detailed illustration of the valve unit 201 being omitted for the sake of clarity. The oscillation damper 200 essentially includes a pressure pipe 202 in which a piston 203 on a piston rod 204 divides a working space 205 into an upper or piston-rod-side working chamber 211 and a lower working chamber 206. A bottom valve unit 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating cheer 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. Both the upper and the lower working chambers 211, 206 are preferably filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211. According to an illustrative example, the oscillation damper works as follows: When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high, such that a high pressure occurs within the lower working chamber 206 and also within the upper working chamber 211.

By the connecting orifice 210 and the fluid path 208 the upper working chamber 211 is connected with the compensating chamber 212 via the valve unit 201. This is shown in more detail in FIG. 9, which will be described later. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. As such, the damping force can be reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. AS such, the damping force can again be reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

In FIG. 9 one can again see the fluid path 208 and the compensating chamber 212, which are interconnectable through the valve unit 201. The fluid path 208 is connected to the upper working chamber 211 as shown in FIG. 8. The flow direction from the fluid path 208 to the compensating chamber 212 across the valve unit 201 is indicated in FIG. 9 by the dotted line D provided with arrows indicating the flow direction both for inward movement and outward movement of the piston rod 204 with respect to the pressure pipe 202. One can see in FIG. 9 a valve member S, such can be lifted with respect to a valve seat S, such as to open the flow path D from the fluid path 208 to the compensating chamber 212.

For explaining the principles of the embodiment of the present invention shown in FIGS. 8 and 9, it is sufficient to say that the valve member V is urged downward in the closing sense towards the valve seat S by a helical compression spring H and that the valve member V can be lifted in response to upward movement of an electromagnetic armature member A. This armature member A is biased in downward direction by a helical compression spring G and can be lifted by energization of a magnetic coil 219 which is energized through a current supple cable 245.

The valve unit 201 comprises a housing 220. This housing 220 is composed by the side tube 217 and a cover unit 221. The side tube 217 is welded at 222 to the container tube 216. The cover unit 221 is fastened to the side tube 217.

A pot-shaped valve components housing 223 is inserted into the side tube 217 and is axially located on a shoulder face 230 inside the side tube 217. Various valve components are located inside the valve components housing 223. The lower end of the valve components housing 223 is shaped as a tube section 224, which provides the valve seat S and is sealingly connected to the fluid path 208.

The cover unit 221 comprises an iron jacket 225 integral with an iron end wall 226. The iron jacket 225 and the iron end wall 226 are coated with a plastic layer 227. The annular electromagnetic coil 219 is housed within the iron jacket 225. This electromagnetic coil 219 is carried by a coil carrier 228, which is annular about the axis $B_x$ and is open in a radially outward direction. The coil carrier 228 is closed in the radially outward direction by a plastics material 231 integral with the plastic layer 227 through openings 237 of the iron jacket 225. The plastics layer 227 and the plastics material 231 are integrally moulded by injection moulding with the iron jacket 225, the iron end wall 226 integral therewith, and the electromagnetic coil 219 and carrier 228 being inserted into the injection mould.

A ferromagnetic core 232 is inserted into a central opening of the iron end wall 226 and covered by the plastics layer 227. An iron flange portion 233 is provided at the lower side of the electromagnetic coil 219 and is engaged with a shoulder face 234 of the iron jacket 225. A pole tube 235 is seated within an annular recess 236 of the iron flange portion 233. The pole tube 235 is sealingly connected to the iron flange portion 233 and to the ferromagnetic core 232. The armature A is guided within the pole tube 235. The pole tube 235 is made of nonmagnetic material so that the magnetic field lines are deflected by the lower end of the pole tube 235. The iron jacket 225, the iron end wall 226, the ferromagnetic core 232 and the iron flange portion 233 form a ferromagnetic core arrangement which toroidally surrounds the electromagnetic coil 219.

The cover unit 221 is fastened to the side tube 217 by a sleeve-shaped extension 238 of the iron jacket 225. This sleeve-shaped extension 238 axially overlaps the side tube 217 by a circumferential bead 239 being embossed into a circumferential groove 240 on the radially outer face of the side tube 217. The iron jacket 225 is provided with a pretensioning flange 241. The pretensioning flange 241 offers a pretension face 242. The cover unit 221 can be pretensioned in downward direction as shown in FIG. 7 toward the container tube 216 by a pretensioning tool engaging the container tube 216, on the one hand, and the pretensioning face 242, on the other hand. As such, the iron flange portion 233 can be pressed against the upper end of the valve components housing 223, the valve components housing 223 is engaged with the shoulder face 230 of the side tube 217, and the iron flange portion 233 is engaged with the shoulder face 234 of the iron jacket 225. The helical compression spring H is compressed between the iron flange portion 233 and the valve member V, which is seated on the valve seat S.

While maintaining this pretension of the cover unit 221 against the side tube 217, the bead 239 is rolled or caulked into the circumferential groove 240 of the side tube 217 so that after removing the pretensioning tool an internal pretension is maintained. A sealing ring 243 is, therefore, maintained in sealing engagement with the valve components housing 223, the iron flange portion 233 and the side tube 217. As such, the compartment C confined by the side tube 217 and the cover unit 221 is sealed against atmosphere. All components of the valve unit 201 are positioned with respect to each other, and the helical compression spring H as well as the helical compression spring G and further springs are biased to the desired degree.

It is to be noted that the upper end of the side tube 217 is radially engaged at 244 with the iron flange portion 233 such that when rolling or caulking the bead 239 into the groove 240, no deformation of the side tube 217 and of the iron jacket 225 can occur.

The electromagnetic coil 219 is completely separated from the liquid within the compartment C by the iron flange portion 233. The pretension during connecting the cover unit 221 and the side tube 217 is selected such that no play can occur.

One feature of the invention resides broadly in the arrangement for control of a chassis-vibration damping device with a variable damping force characteristic in a vehicle including: an acceleration sensor 17 detecting the instantaneous value of an acceleration variable on the vehicle 1 in a measurement direction 19 specified with reference to an axis of motion x of the vehicle 1 running longitudinally, an axis of motion y running transversely, and an axis of motion z running vertically, which sensor delivers a measurement signal representing the instantaneous value of the acceleration variable, an evaluation device 27 which determines a damping force requirement as a function of the instantaneous value of the acceleration variable detected, and an adjustment device 9 which sets the damping force characteristic of the chassis-vibration damping device 7 as a function of the damping force requirement determined, characterized in that the acceleration sensor 17 in a vehicle 1 which has a natural frequency of vibration in the direction of at least one first of its axes of motion x, y, z is disposed in the vehicle 1 with a measurement axis 19 running at an angle to at least one of these first axes of motion x, y, z and at least one second of its axes of motion x, y, that the evaluation device 27 includes signal separation means 25 selectively responding to the natural frequency of at least one at least one first measurement signal component $b_z$ representing of the first axes of motion z disposed in the signal path of the measurement signal, which separates the measurement signal into the instantaneous value of the acceleration variable in the direction of the first axis of motion z and into a second measurement signal component $b_{xy}$ jointly associated with each second axis of motion x, y, that the evaluation device 27 includes evaluation means 35, 37 associated separately with every first measurement signal component $b_z$ and the second measurement signal component $b_{xy}$, which generate requirement components $n_z$, $n_{xy}$ of the damping force requirement variable as a function of the measurement signal components $b_z$, $b_{xy}$, and that the evaluation device 27 includes adding means 39 which add the requirement components $n_z$, $n_{xy}$ to form a control signal n specifying the damping force characteristic.

Another feature of the invention resides broadly in the arrangement characterized in that the signal separation means 25 for separation of the first measurement signal component $b_z$ from the measurement signal include a filter tuned to the natural frequency, in particular a bandpass filter 31 with a midfrequency tuned to the natural frequency, as well as subtraction means 33 to form the second measurement signal component $b_{xy}$, which means subtract every first measurement signal component $b_z$ from the measurement signal.

Yet another feature of the invention resides broadly in the arrangement characterized in that the evaluation means 35, 37 generating the requirement variables associated with the individual measurement signal components $b_z$ $b_{xy}$ are designed as a memory of characteristics.

Still another feature of the invention resides broadly in the arrangement characterized in that the acceleration sensor 17 is disposed on the vehicle 1 with a measurement direction 19 signal component $b_z$ has a filter selectively tuned to the natural running at an angle to the horizontal axis of motion z, and the signal separation means 25 for delivery of the first measurement frequency of a vehicle body 3 vibratable in the vertical direction, in particular a bandpass filter 31 with a midfrequency tuned to this natural frequency.

A further feature of the invention resides broadly in the arrangement characterized in that the acceleration sensor 17 is disposed on the vehicle 1 with a measurement direction 19 disposed at an angle to the longitudinal axis of motion x and at an angle to the transverse axis of motion y, and that the signal separation means 25 have subtraction means 33 subtracting the first measurement signal component $b_z$ from the measurement signal of the acceleration sensor 17 for delivery of the second measurement signal component $b_{xy}$.

Another feature of the invention resides broadly in the arrangement characterized in that the angle α to the longitudinal axis of motion x is smaller than or essentially equal to angle β to the transverse axis of motion y, in particular that the measurement direction of the acceleration sensor 17 is disposed at an angle of approximately 45° at least to the longitudinal axis of motion x and to the transverse axis of motion y, but in particular also is angled by approximately 45° to the vertical axis of motion z.

Yet another feature of the invention resides broadly in the arrangement characterized in that the signal separation means 25 jointly associated yield the second measurement signal component $b_{xy}$ of the longitudinal axis of motion x and the transverse axis of motion y and that the measurement direction 19 of the acceleration sensor 17, the signal separation means 25, and evaluation means 37 associated with the second measurement signal component $b_{xy}$, are dimensioned such that the acceleration of the vehicle body 3 in the direction of the longitudinal axis of motion x and in the direction of the transverse axis of motion y have essentially the same effect on the second requirement component $n_{xy}$.

Still another feature of the invention resides broadly in the arrangement characterized in that a lowpass filter 29 is connected upstream from the signal separation means 25, which filter is permeable for the natural frequency of a vehicle body 3 of the vehicle 1 but closed to the natural frequency of the wheels 5 of the chassis.

A further feature of the invention resides broadly in the arrangement characterized in that the evaluation device 27 includes a hysteresis device 41, 43 to restrict the frequency with which the damping force characteristic is variable, which temporally delays a change in the damping force characteristic in at least one of two opposing directions of change, in particular, temporally delays exclusively with a change from a harder damping force characteristic to a softer damping force characteristic.

Another feature of the invention resides broadly in the arrangement characterized in that the hysteresis device has hysteresis means 41, 43 specifically associated with the evaluation means 35, 37, which temporally delay a change in the requirement components in at least one change direction, in particular exclusively in the direction of a damping force requirement with a softer damping force characteristic.

Yet another feature of the invention resides broadly in the arrangement characterized in that the adjustment device 9 for adjustment of the damping force characteristic of hydraulic frame-vibration dampers has at least one proportional valve, whose opening cross-section is proportionally adjustable to the control signal.

Examples of acceleration sensor arrangements, which may be utilized in accordance with the embodiments of the present invention, may be found in the following U.S. Pat. No. 4,898,033, which issued to Yamamoto on Dec. 6, 1990; U.S. Pat. No. 4,903,982, which issued to Harara et al. on Feb. 27, 1990; U.S. Pat. No. 4,927,170, which issued to Wada on May 22, 1990; U.S. Pat. No. 4,930,082, which issued to Harara et al. on May 29, 1990; and U.S. Pat. No. 4,948,164, which issued to Hano et al. on Aug. 14, 1990.

Examples of bandpass filters, which may be utilized in accordance with the embodiments of the present invention, may be found in the following U.S. Pat. No. 5,019,792, which issued to DiBiase et al. on May 28, 1991; U.S. Pat. No. 5,028,894, which issued to Speaks on Jul. 2, 1991; U.S. Pat. No. 5,065,453, which issued to Thomas on Nov. 12, 1991; U.S. Pat. No. 5,101,182, which issued to Babbitt et al. on Mar. 31, 1992.

Examples of lowpass filters, which may be utilized in accordance with the embodiments of the present invention, may be found in the following U.S. Pat. No. 5,023,579, which issued to Bentivenga and Bentivenga on Jun. 11, 1991; U.S. Pat. No. 5,032,909, which issued to Sato et al. on Jul. 16, 1991; U.S. Pat. No. 5,119,321, which issued to Burton et al. on Jun. 2, 1992; and U.S. Pat. No. 5,155,743, which issued to Jacobs on Oct. 13, 1992.

Examples of hysteresis arrangements, which may be utilized in accordance with the embodiments of the present invention, may be found in the following U.S. Pat. No. 4,903,813, which issued to Maki on Feb. 27, 1990; U.S. Pat. No. 4,932,921, which issued to Kobayashi et al. on Jun. 12, 1990; U.S. Pat. No. 5,065,462, which issued to Kagiyama et al. on Nov. 19, 1991; U.S. Pat. No. 4,947,706, which issued to Umeyama et al. on Aug. 14, 1990; U.S. Pat. No. 5,103,396, which issued to Hiwatashi et al. on Apr. 7, 1992; U.S. Pat. No. 4,965,475, which issued to Kautz on Oct. 23, 1990.

Examples of proportional valve arrangements, which may be utilized in accordance with the embodiments of the present invention, may be found in the following U.S. Pat. No. 4,948,165, which issued to Takahashi et al. on Aug. 14, 1990; U.S. Pat. No. 5,042,832, which issued to Takahashi et al. on Aug. 27, 1991; U.S. Pat. No. 4,991,491, which issued to Neumann on Feb. 12, 1991.

Examples of lookup table arrangements and related arrangements, which may be utilized in accordance with the embodiments of the present invention, may be found in the following U.S. Pat. No. 4,893,234, which issued to Davidson et al. on Jan. 9, 1990; U.S. Pat. No. 4,920,496, which issued to Szczebak, Jr., on Apr. 24, 1990; U.S. Pat. No. 4,968,985, which issued to Riggle et al. on Nov. 6, 1990; U.S. Pat. No. 4,974,078, which issued to Tsai on Nov. 27, 1990.

General examples of components, relating to apparatus for the control of vibration dampers, which may be utilized in accordance with the embodiments of the present invention, may be found in the following U.S. Pat. No. 4,872,701, which issued to Akatsu et al. in Oct. 1989; U.S. Pat. No. 4,869,528 to Buma et al., which issued to Buma et al. in Sept. 1989; U.S. Pat. No. 4,865,347, which issued to Fukushima et al. in Sept. 1989; U.S. Pat. No. 4,853,860, which issued to Achenbach in Aug. 1989; U.S. Pat. No. 4,827,416, which issued to Kawagoe et al. in May 1989; U.S. Pat. No. 4,765,648, which issued to Mander et al. in Aug. 1988; U.S. Pat. No. 4,669,749, which issued to Tanaka et al. in June 1987; and U.S. Pat. No. 4,664,409, which issued to Nakashima et al. in May 1987.

Some examples of systems in which embodiments of the present invention would be used are: U.S. Pat. No. 5,228,719, entitled "Automotive Active Suspension System for Anti-Rolling Control"; U.S. Pat. No. 5,231,583 to Lizell, entitled "Method and Apparatus for Dynamic Leveling of a Vehicle Using an Active Suspension System"; U.S. Pat. No. 5,195,772 to Bachrach, Levitt, and Nametz, entitled "Valve Configuration for Converting an Active Suspension System Into a Passive Suspension System"; U.S. Pat. No. 5,183,127 entitled "Suspension-Traction Total Control System"; U.S. Pat. No. 5,208,749 entitled "Method for Controlling Active Suspension System on the Basis of Rotational Motion Model"; U.S. Pat. No. 5,299,488 to Kadlicko and Halina, entitled "Active Suspension System"; U.S. Pat. No. 5,322,319 entitled "Active Suspension Apparatus for a Vehicle"; U.S. Pat. No. 5,322,321 to Yopp, entitled "Vehicle Active Suspension System"; and U.S. Pat. No. 4,700,812 entitled "Vehicular Suspension System," issued to Moser.

Some types of automobile suspension systems that could be utilized in accordance with a rotary actuator motor may be or are disclosed by the following U.S. Pat. No. 5,178,406 to Reynolds, entitled "Torsion Bar Suspension"; U.S. Pat. No. 5,286,059 to Tabs, entitled "Height Control System when Vehicle Is Jacked Up"; U.S. Pat. No. 5,288,101 to Minnett, entitled "Variable Rate Torsion Control System for Vehicle Suspension"; and U.S. Pat. No. 5,290,048 to Takahashi and Yamashita, entitled "Working Fluid Circuit for Active Suspension Control System of Vehicle".

Some other examples of systems that could be used in conjunction with the present invention may be or are disclosed by the following U.S. Pat. No. 5,251,728 to Mund et al., entitled "Hydraulic Vibration Damper or Shock Absorber with Electrical Connector Therefor"; U.S. Pat. No. 4,785,920 to Knecht et al., entitled "Hydraulic Adjustable Shock Absorber"; U.S. Pat. No. 4,719,800 to Moser, entitled "Accelerometer"; U.S. Pat. No. 4,989,148 to Gürke et al., entitled "Apparatus for the Computer-Assisted Control of Vibration Dampers of a Vehicular Suspension System as a Function of the Roadway"; U.S. Pat. No. 4,749,070 to Moser et al., entitled "Hydraulic Vibration Damper Having Adjustable Damping Valve".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration at%ached hereto, are hereby incorporated by reference as if set forth in their entirety herein.

The corresponding foreign patent publication applications, namely, Federal Republic of Germany Patent Application No. P 44 15 155.1, filed on May 2, 1994, having inventors Udo Borschert and Thomas Kutsche, and DE-OS P 44 15 155.1 and DE-PS P 44 15 155.1, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A vehicle for travelling along a travel surface, said vehicle including an adjustable vibration damping system for damping vibrations transmitted to said vehicle by said travel surface, said vehicle comprising:

a vehicle body;

said vehicle body having a longitudinal axis in a direction of normal longitudinal travel of said vehicle, said longitudinal axis being parallel to said travel surface;

said vehicle body having a lateral axis, said lateral axis being orthogonal to said longitudinal axis, and said lateral axis being parallel to said travel surface;

said lateral axis and said longitudinal axis forming a substantially horizontal plane;

said vehicle body having a vertical axis, said vertical axis being orthogonal to said longitudinal axis, to said lateral axis, and to said travel surface;

said vehicle body having a natural frequency of vibration in a direction along said vertical axis;

said vehicle additionally comprising at least one wheel for contacting said travel surface;

said adjustable vibration damping system comprising:

adjustable vibration damping means for applying an adjusted vibrational damping action between said vehicle body and said at least one wheel in response to at least one vibrational damping control signal;

a sole translational acceleration sensor positioned at a sole point on said vehicle body for generating a singular acceleration signal;

said sole translational acceleration sensor having a sole measurement axis;

said sole translational acceleration sensor being disposed to sense an acceleration of said vehicle body along said sole measurement axis;

said sole measurement axis of said sole translational acceleration sensor being disposed at a vertical angle with respect to said vertical axis;

said vertical angle comprising a substantial angle;

said sole measurement axis of said sole translational acceleration sensor being disposed at a horizontal angle with respect to said horizontal plane;

said horizontal angle comprising a substantial angle;

processing means for processing said singular acceleration signal to generate therefrom said vibrational damping control signal, said processing means comprising:

separating means for separating said singular acceleration signal into:

a first acceleration component, said first acceleration component being the component of said singular acceleration signal in the direction of said vertical axis of said vehicle body; and a second acceleration component, said second acceleration component being the component of said singular acceleration signal in directions substantially orthogonal to said vertical axis of said vehicle body;

first evaluation means for evaluating said first acceleration component and for determining a first damping force component in said direction of said vertical axis of said vehicle body;

second evaluation means for evaluating said second acceleration component and for determining a second damping force component in said directions substantially orthogonal to said vertical axis of said vehicle body;

combining means for combining said first damping force component and said second damping force component to form said at least one vibrational damping control signal; and means connecting said combining means and said adjustable vibration damping means to apply the adjusted vibrational damping action between said vehicle body and said at least one wheel in response to said at least one vibrational damping signal.

2. A vehicle according to claim 1, wherein said separating means comprises:

a bandpass filter having a midfrequency tuned to said natural frequency of vibration of said vehicle body along said vertical axis; and subtraction means for subtracting said first acceleration component from said singular acceleration signal generated by said sole translational acceleration sensor to thereby form said second acceleration component.

3. A vehicle according to claim 2, wherein: said first evaluation means comprises a memory of characteristics associating a plurality of values of said first acceleration component with associated values of said first damping force component.

4. A vehicle according to claim 3, wherein:

said second evaluation means comprises a memory of characteristics associating a plurality of values of said second acceleration component with associated values of said second damping force component.

5. A vehicle according to claim 4, wherein: said sole measurement axis of said sole translational acceleration sensor is disposed at a substantial longitudinal angle with respect to said longitudinal axis of said vehicle body; and said sole measurement axis of said sole translational acceleration sensor is disposed at a substantial lateral angle with respect to said lateral axis of said vehicle body.

6. A vehicle according to claim 5, wherein:

said longitudinal angle is at least one of: substantially less than and substantially equal to said lateral angle.

7. A vehicle according to claim 6, wherein:

said sole measurement axis of said sole translational acceleration sensor is disposed with respect to said longitudinal axis of said vehicle body and said lateral axis of said vehicle body such that said second acceleration component comprises substantially equal portions of accelerations along said longitudinal axis and said lateral axis of said vehicle body.

8. A vehicle according to claim 7, wherein each of said longitudinal angle, said lateral angle and said vertical angle are substantially equal to about 45 degrees.

9. A vehicle according to claim 8, wherein:

said processing means additionally comprises lowpass filter means;

said lowpass filter means being substantially permeable to said natural frequency of vibration of said vehicle body along said vertical axis;

said at least one wheel having a natural frequency; and said lowpass filter being substantially nonpermeable to said natural frequency of said at least one wheel.

10. A vehicle according to claim 9, wherein:

said processing means additionally comprises hysteresis means for temporarily delaying a change in the damping force characteristic.

11. A vehicle according to claim 10, wherein:

said hysteresis means comprises means for temporarily delaying a change from a harder damping force characteristic to a softer damping force characteristic;

said adjustable vibration damping means comprises proportional valve means;

said proportional valve means having a variable cross sectional area; and said processing means comprises means for varying said cross sectional area of said proportional valve means in accordance with a magnitude of said vibrational damping control signal.

12. A suspension system in a motor vehicle including a suspension system having an adjustable damping system with an acceleration sensor, said vehicle being for travel over a travel surface, said vehicle comprising:

a vehicle body;

said vehicle body having a longitudinal axis in a direction of normal longitudinal travel of said vehicle, said longitudinal axis being parallel to said travel surface;

said vehicle body having a lateral axis, said lateral axis being orthogonal to said longitudinal axis, and said lateral axis being parallel to said travel surface;

said lateral axis and said longitudinal axis forming a substantially horizontal plane; and said vehicle body having a vertical axis disposed substantially orthogonally with respect to said horizontal plane and said travel surface; and at least one vehicle wheel;

said suspension system comprising:

adjustable vibration damping means for applying a vibrational damping action between said vehicle body and said at least one vehicle wheel and for varying at least one characteristic of said applied vibrational damping action in response to at least one vibrational damping control signal;

means for sensing an acceleration representative of said vehicle body and for generating a singular acceleration signal representative thereof, said sensing means consisting of a sole uniaxial acceleration sensor having a sole measurement axis, said sole uniaxial acceleration sensor having means for being mounted at a sole point on the body of a vehicle;

said sole measurement axis of said sole uniaxial acceleration sensor being disposed at a substantial vertical angle with respect to said vertical axis of said vehicle body;

said sole measurement axis of said sole uniaxial acceleration sensor being disposed at a substantial horizontal angle with respect to said horizontal plane;

means for processing said singular acceleration signal representative of said vehicle body acceleration and for generating therefrom said at least one vibrational damping control signal;

said processing means comprising:

means for separating said singular acceleration signal representative of said vehicle body acceleration into at least two separate components;

means for separately evaluating each of said at least two separate components and separately producing at least two subsidiary control signals respectively representative of each of said at least two separate components; and means for generating said at least one vibrational damping control signal as a function of at least one of said at least two subsidiary control signals; and means connecting said generating means and said adjustable vibration damping means for applying a vibrational damping action between said vehicle body and said at least one vehicle wheel and for varying at least one characteristic of said applied vibrational damping action in response to said at least one vibrational damping control signal.

13. The suspension system according to claim 12, wherein:

said separating means comprises a bandpass filter having a midfrequency tuned to said natural frequency of vibration of said vehicle body along said vertical axis;

said at least two separate components comprise a first acceleration component and a second acceleration component;

said first acceleration component being the component of said singular acceleration signal in the direction of said vertical axis of said vehicle body;

said second acceleration component being the component of said singular acceleration signal in the directions substantially orthogonal to said vertical axis of said vehicle body; and said separating means comprises subtraction means for subtracting said first acceleration component from said singular acceleration signal generated by said sole uniaxial acceleration sensor to thereby form said second acceleration component.

14. The suspension system according to claim 13, wherein said means for separately evaluating each of said at least two separate components and separately producing at least two subsidiary control signals respectively representative of each of said at least two separate components comprises:

first evaluation means for evaluating said first acceleration component and for determining a first one of said at least two separate subsidiary control signals;

second evaluation means for evaluating said second acceleration component and for determining a second one of said at least two subsidiary control signals;

said first subsidiary control signal representing a first damping force component;

said second subsidiary control signal representing a second damping force component; and said first evaluation means comprises a memory of characteristics associating a plurality of values of said first acceleration component with associated values of said first damping force.

15. The suspension system according to claim 14, wherein:

said second evaluation means comprises a memory of characteristics associating a plurality of values of said second acceleration component with associated values of said second damping force component.

16. The suspension system according to claim 15, wherein:

said sole measurement axis of said sole translational acceleration sensor is disposed at a substantial longitudinal angle with respect to said longitudinal axis of said vehicle body; and said sole measurement axis of said sole translational acceleration sensor is disposed at a substantial lateral angle with respect to said lateral axis of said vehicle body.

17. The suspension system according to claim 16, wherein said longitudinal angle is at least one of: substantially less than and substantially equal to said lateral angle.

18. The suspension system according to claim 17, wherein:

said sole measurement axis of said sole translational acceleration sensor is disposed with respect to said longitudinal axis of said vehicle body and said lateral axis of said vehicle body such that said second acceleration component comprises substantially equal portions of accelerations along said longitudinal axis and said lateral axis of said vehicle body;

each of said longitudinal angle, said lateral angle and said vertical angle are substantially equal to about 45 degrees;

said processing means additionally comprises lowpass filter means;

said lowpass filter means being substantially permeable to said natural frequency of vibration of said vehicle body along said vertical axis;

said at least one wheel having a natural frequency;

said lowpass filter being substantially nonpermeable to said natural frequency of said at least one wheel;

said processing means additionally comprises hysteresis means for temporarily delaying a change in the damping force characteristic;

said hysteresis means comprises means for temporarily delaying a change from a harder damping force characteristic to a softer damping force characteristic;

said adjustable vibration damping means comprises proportional valve means;

said proportional valve means having a variable cross sectional area; and said processing means comprises means for varying said cross sectional area of said proportional valve means in accordance with a magnitude of said vibrational damping control signal.

19. A suspension system in a motor vehicle including a suspension system having an adjustable damping system with an acceleration sensor, said vehicle being for travel over a travel surface, said vehicle comprising:

a vehicle body;

said vehicle body having a longitudinal axis in a direction of normal longitudinal travel of said vehicle, said longitudinal axis being parallel to said travel surface;

said vehicle body having a lateral axis, said lateral axis being orthogonal to said longitudinal axis, and said lateral axis being parallel to said travel surface;

said lateral axis and said longitudinal axis forming a substantially horizontal plane; and said vehicle body having a vertical axis disposed substantially orthogonally with respect to said horizontal plane and said travel surface; and at least one vehicle wheel;

said suspension system comprising:

adjustable vibration damping means for applying a vibrational damping action between said vehicle body and said at least one vehicle wheel and for varying at least one characteristic of said applied vibrational damping action in response to at least one vibrational damping control signal;

means for sensing an acceleration representative of said vehicle body and for generating a singular acceleration signal representative thereof, said sensing means consisting of a sole uniaxial acceleration sensor having a sole measurement axis, said sole uniaxial acceleration sensor having means for being mounted at a sole point on the body of a vehicle;

said sole measurement axis of said sole uniaxial acceleration sensor being disposed at a substantial angle with respect to said vertical axis of said vehicle body;

said sole measurement axis of said sole uniaxial acceleration sensor being disposed at a substantial angle with respect to said horizontal plane;

means for processing said singular acceleration signal and for generating therefrom said at least one vibrational damping control signal; and said processing means comprising means for separating said singular acceleration signal into at least two separate acceleration components.

20. The suspension system according to claim 19, wherein:

said at least two separate acceleration components comprise a first acceleration component and a second acceleration component;

said first acceleration component being the component of said singular acceleration signal in the direction of said vertical axis of said vehicle body;

said second acceleration component being the component of said singular acceleration signal in the directions substantially orthogonal to said vertical axis of said vehicle body; and said separating means comprises subtraction means for subtracting said first acceleration component from said singular acceleration signal generated by said sole uniaxial acceleration sensor to thereby form said second acceleration component.

* * * * *

UNITED STATES PATENT AND TRADEMARK OFFICE
CERTIFICATE OF CORRECTION

PATENT NO. : 5,721,681

DATED : February 24, 1998

INVENTOR(S) : Udo BORSCHERT and Thomas KUTSCHE

Page 1 of 4

It is certified that error appears in the above-identified patent and that said Letters Patent is hereby corrected as shown below:

On the title page, item [56], under the U.S. PATENTS DOCUMENTS section, after '8/1995', delete "Mataunaga" and insert --Matsunaga--.

In column 7, line 24, after '10 to 15', delete "Ms." and insert --Hz.--.

In column 8, line 32, after 'desired' insert --output values for given input values, to achieve any desired--.

In column 8, line 50, after 'i.e.,', delete "An" and insert --in--.

UNITED STATES PATENT AND TRADEMARK OFFICE
CERTIFICATE OF CORRECTION

PATENT NO. : 5,721,681
DATED : February 24, 1998
INVENTOR(S) : Udo BORSCHERT and Thomas KUTSCHE It is certified that error appears in the above-identified patent and that said Letters Patent is hereby corrected as shown below:

In column 11, line 34, after '(e.g.,', delete "formulae)" and insert --formulas)--.

In column 17, line 7, after 'compensating', delete "cheer" and insert --chamber--.

In column 18, line 31, after 'member', delete "S, such" and insert --V which--.

In column 20, line 17, after the first occurrence of 'one' delete "at least one first measurement signal component $b_z$".

UNITED STATES PATENT AND TRADEMARK OFFICE
CERTIFICATE OF CORRECTION

PATENT NO. : 5,721,681
DATED : February 24, 1998
INVENTOR(S) : Udo BORSCHERT and Thomas KUTSCHE It is certified that error appears in the above-identified patent and that said Letters Patent is hereby corrected as shown below:

In column 20, line 18, before 'of' delete "representing".

In column 20, line 20, after 'into' insert --at least one first measurement signal component $b_z$ representing--.

In column 20, line 51, delete the entire line which reads "signal component $b_z$ has a filter selectively tuned to the".

In column 20, line 52, before 'running' delete "natural".

UNITED STATES PATENT AND TRADEMARK OFFICE
CERTIFICATE OF CORRECTION

PATENT NO. : 5,721,681
DATED : February 24, 1998
INVENTOR(S) : Udo BORSCHERT and Thomas KUTSCHE It is certified that error appears in the above-identified patent and that said Letters Patent is hereby corrected as shown below:

In column 20, line 54, after 'measurement' insert --signal component $b_z$ has a filter selectively tuned to the natural--.

In column 21, line 62, after 'to', delete "Speaks" and insert --Speake--.

In column 23, line 2, after 'to', delete "Tabs," and insert --Tabe,--.

In column 23, line 32, after 'Declaration', delete "at%ached" and insert --attached--.

Signed and Sealed this

Second Day of March, 1999

Attest:

Q. TODD DICKINSON

*Attesting Officer*    *Acting Commissioner of Patents and Trademarks*